(12) United States Patent
Chen

(10) Patent No.: US 10,690,172 B2
(45) Date of Patent: Jun. 23, 2020

(54) EMBEDDED CONNECTION SOCKET AND ASSEMBLY CASING

(71) Applicant: Wistron Corporation, New Taipei (TW)

(72) Inventor: Dong-Ying Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 618 days.

(21) Appl. No.: 14/923,454

(22) Filed: Oct. 27, 2015

(65) Prior Publication Data

US 2016/0333910 A1 Nov. 17, 2016

(30) Foreign Application Priority Data

May 13, 2015 (CN) .......................... 2015 1 0244188

(51) Int. Cl.
*F16B 5/00* (2006.01)
*F16B 5/02* (2006.01)
(Continued)

(52) U.S. Cl.
CPC .......... *F16B 37/122* (2013.01); *F16B 5/0088* (2013.01); *F16B 5/0208* (2013.01); *F16B 37/048* (2013.01)

(58) Field of Classification Search
CPC .... F16B 5/0056; F16B 5/0088; F16B 5/0092; F16B 5/02; F16B 5/0208; F16B 5/0291;
(Continued)

(56) References Cited

U.S. PATENT DOCUMENTS 4,509,308 A * 4/1985 Dettfurth .................. F16B 5/01
411/180
4,878,795 A * 11/1989 Woodrow ................. F16B 5/01
411/183
(Continued)

FOREIGN PATENT DOCUMENTS

EP    2484924 A1 *  8/2012  ............ F16B 37/042
TW    M395746 U1    1/2011
(Continued)

OTHER PUBLICATIONS

Office action dated Mar. 4, 2016 for the Taiwan application No. 104117856, filing date: Jun. 2, 2015, p. 1 line 13-14, p. 2-10 and p. 11 line 1-18.

*Primary Examiner* — Josh Skroupa
(74) *Attorney, Agent, or Firm* — Winston Hsu

(57) ABSTRACT

An embedded connection socket is used for joining two objects. An assembly casing is assembled by the embedded connection socket. The embedded connection socket includes a base portion and an insertion part. The insertion part is inserted in an accommodating recess of the base portion and fixed by a fixing portion that is formed by shaping a plastic portion of the base portion at the opening of the accommodating recess. Therein, the fixing portion can prevent the insertion part from departing from the accommodating recess. The insertion part includes an engagement structure exposed through the accommodating recess. The embedded connection socket joins the two objects by the engagement structure.

18 Claims, 19 Drawing Sheets

(51) Int. Cl.
*F16B 37/04* (2006.01)
*F16B 37/12* (2006.01)

(58) Field of Classification Search
CPC .... F16B 17/002; F16B 37/044; F16B 37/048; F16B 37/122; Y10T 403/33; Y10T 403/335; Y10T 403/3981; Y10T 403/3986; Y10T 403/3941; Y10T 403/49; Y10T 403/56; Y10T 403/64; Y10T 403/645; Y10T 403/7098; Y10T 403/74
USPC ....... 403/167, 168, 193, 199, 200, 274, 335, 403/337, 383, 404
See application file for complete search history.

(56) References Cited

U.S. PATENT DOCUMENTS

| | | | | |
|---|---|---|---|---|
| 5,017,328 | A * | 5/1991 | Mazurek | F16F 1/3713 248/560 |
| 5,295,755 | A * | 3/1994 | DeHaan, III | A47B 97/00 248/205.3 |
| 6,540,462 | B1 * | 4/2003 | Bretschneider | F16B 37/005 411/301 |
| 7,486,500 | B2 | 2/2009 | I | |
| 8,672,598 | B2 * | 3/2014 | Chen | F16B 37/005 411/301 |
| 9,140,279 | B2 * | 9/2015 | Frias | F16B 5/0208 |
| 9,468,113 | B2 * | 10/2016 | Degner | G06F 1/1613 |
| 2009/0123220 | A1 * | 5/2009 | Chou | F16B 37/044 403/21 |
| 2013/0108392 | A1 * | 5/2013 | Henriksen, Jr. | F16B 5/0642 411/166 |
| 2015/0056039 | A1 * | 2/2015 | Jin | F16B 37/048 411/80.6 |
| 2016/0010679 | A1 * | 1/2016 | Makino | F16B 37/048 411/34 |
| 2016/0091006 | A1 * | 3/2016 | Lai | F16B 5/02 411/172 |
| 2016/0121812 | A1 * | 5/2016 | Avalos Sartorio | F16B 5/02 29/464 |

FOREIGN PATENT DOCUMENTS

| | | |
|---|---|---|
| TW | 201219670 A1 | 5/2012 |
| WO | 2008157265 A1 | 12/2008 |
| WO | WO-2012029254 A1 * 3/2012 | ............ F16B 37/044 |

* cited by examiner

EMBEDDED CONNECTION SOCKET AND ASSEMBLY CASING

BACKGROUND OF THE INVENTION

1. Field of the Invention

The disclosure relates to an embedded connection socket, an assembly casing, and a method for producing an embedded connection socket, and especially relates to an embedded connection socket using an insertion part as an engagement structure, an assembly casing assembled by the embedded connection socket, and a method for producing the embedded connection socket.

2. Description of the Prior Art

For conventional embedded connection sockets, an insertion part is joined with a hole of a base portion usually by tight fitting, using a hooking structure, melting the inner sidewall of the hole, and so on, for firmly fixing the insertion part on the base portion. Therein, for the cases by tight fitting, any slight size variation will lead to a great variation in the friction force induced between the insertion part and the hole, even to a structural damage, e.g. hole deformation or cracks. Hence, in practice, the insertion part and the hole need to be provided with higher precision, which includes a higher production cost and a defective rate. For the cases by using a hooking structure, during the joining of the insertion part with the hole, it is unavoidable to damage at least a portion of the inner sidewall of the hole. The structural damage will affect the joining force of the hooking structure with the inner sidewall, so that the joining force is unreliable or not easily to control. For the cases by melting the inner sidewall of a hole, the hole needs to be heated so as to induce a plasticity in a certain degree, so that the insertion part can enter into the hole, e.g. by directly heating the insertion part, or by applying ultrasonic waves to the insertion part so that heat is produced at the contact interface of the insertion part with the inner sidewall of the hole. Therein, for the cases by directly heating the insertion part, the insertion part needs to be heated before inserted into the hole, of which the efficiency is lower. During the insertion of the insertion part into the hole, the hole as a whole sustains a force for inserting the insertion part, so the structure strength of the hole decreases, which probably leads to a twist, a slant, even a crack, and so on. Furthermore, the material in the hole is melted, flows and re-solidifies so that the insertion part may not closely join with the hole due to a difference between the coefficients of thermal expansion of the hole and the insertion part, which worsens the above problems. Therefore, the current ways for joining the insertion part with the hole tend to damage or weaken the hole, or makes the position and angle of the insertion part relative to the hole difficult to control or deviated from a predetermined condition.

SUMMARY OF THE INVENTION

An objective of the disclosure is to provide an embedded connection socket for joining two objects. The embedded connection socket uses a fixing portion at an opening of an accommodating recess to fix an insertion part, so that the strength of the accommodating recess accommodating the insertion part can be maintained easily. Furthermore, the fixing portion also can prevent the insertion part from escaping from the accommodating recess, so as to solve the problems in the prior of deformation or damage to the hole, the poor joining of the insertion part with the hole, and the difficult control of the position and angle of the insertion part relative to the hole.

An embedded connection socket according to the disclosure is used for joining a first object and a second object. The embedded connection socket is disposed on the first object and includes a base portion and an insertion part. The base portion includes an accommodating recess and a fixing portion. The accommodating recess has an opening. The fixing portion is made of thermoplastic material and protrusively disposed at the opening. The insertion part is disposed in the accommodating recess. The insertion part includes a blocked surface, a positioning structure, and an engagement structure. The accommodating recess supports the insertion part through the positioning structure. The blocked surface is located at the opening. The fixing portion covers at least a portion of the blocked surface. The engagement structure is exposed through the opening. Therein, the embedded connection socket joins the first object and the second object through the engagement structure. Thereby, the fixing portion can prevent the insertion part from departing from the accommodating recess through the opening. The base portion can use the accommodating recess and the fixing portion to provide the insertion part enough fixing structural strength, so that the insertion part can be precisely and firmly disposed on the base portion.

An objective of the disclosure is to provide an assembly casing having an embedded connection socket according to the disclosure. The assembly casing uses the embedded connection socket to precisely and firmly assemble casings of the assembly casing.

An assembly casing according to the disclosure includes a first casing, an embedded connection socket, a second casing, and a second engagement structure. The embedded connection socket is disposed on the first casing and includes a base portion and an insertion part. The base portion includes an accommodating recess and a fixing portion. The accommodating recess has an opening. The fixing portion is made of thermoplastic material and protrusively disposed at the opening. The insertion part is disposed in the accommodating recess. The insertion part includes a blocked surface, a positioning structure, and a first engagement structure. The accommodating recess supports the insertion part through the positioning structure. The blocked surface is located at the opening. The fixing portion covers at least a portion of the blocked surface. The first engagement structure is exposed through the opening. The second engagement structure is disposed on the second casing. The second engagement structure and the first engagement structure are engaged so that the first casing and the second casing are joined. Therefore, by the embedded connection socket having the insertion part precisely and firmly disposed therein, the assembly casing can be precisely and firmly assembled through the embedded connection socket.

An objective of the disclosure is to provide a method for producing an embedded connection socket. The embedded connection socket is used for joining two objects. The method uses a plastic portion on a base portion of the embedded connection socket to form a fixing portion for fixing an insertion part on the base portion without structural damage to an accommodating recess accommodating the insertion part, so that the structural strength of the accommodating recess can be maintained easily and the fixing portion can prevent the insertion part from departing from the accommodating recess through the opening, which can solve the problems in the prior of deformation or damage to the hole, the poor joining of the insertion part with the hole, and the difficult control of the position and angle of the insertion part relative to the hole.

A method for producing an embedded connection socket for joining a first object and a second object according to the disclosure includes: (a) preparing a base portion, the base portion being disposed on the first object and including an accommodating recess and a plastic portion, the accommodating recess having an opening, the plastic portion being made of thermoplastic material and protrusively disposed at the opening; (b) preparing an insertion part, the insertion part including a blocked surface, a positioning structure, and an engagement structure; (C) inserting the insertion part slidably in the accommodating recess, so that the accommodating recess supports the insertion part through the positioning structure, the blocked surface is located at the opening, and the engagement structure is exposed through the opening; (d) preparing a shaping part, the shaping part having a guiding recess; (e) aligning the guiding recess with the plastic portion and moving the shaping part toward the insertion part; and (f) using the guiding recess to guide and shape the plastic portion, so that at least a portion of the plastic portion forms a fixing portion covering at least a portion of the blocked surface, wherein the base portion and the insertion part form the embedded connection socket, and the embedded connection socket joins the first object and the second object through the engagement structure. Thereby, in the insertion of the insertion part into the accommodating recess, the structure of the accommodating recess is maintained without damage. Furthermore, in the process of the shaping part shaping the plastic portion to form the fixing portion for preventing the insertion part from departing from the accommodating recess through opening, the structure of the accommodating recess is also maintained without damage. Therefore, for an embedded connection socket produced by the method, the base portion thereof can use the accommodating recess and the fixing portion to provide the insertion part enough fixing structural strength, so that the insertion part can be precisely and firmly disposed on the base portion.

An objective of the disclosure is to provide a base portion of an embedded connection socket. The base portion is used for fixing an insertion part and includes an accommodating recess and a fixing portion. The accommodating recess has an opening. The fixing portion is made of thermoplastic material and protrusively disposed at the opening. Therein, the insertion part is disposed in the accommodating recess. The fixing portion covers at least a portion of a blocked surface of the insertion part exposed through the opening. Thereby, the fixing portion can prevent the insertion part from departing from the accommodating recess through the opening. The base portion can use the accommodating recess and the fixing portion to provide the insertion part enough fixing structural strength, so that the insertion part can be precisely and firmly disposed on the base portion.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
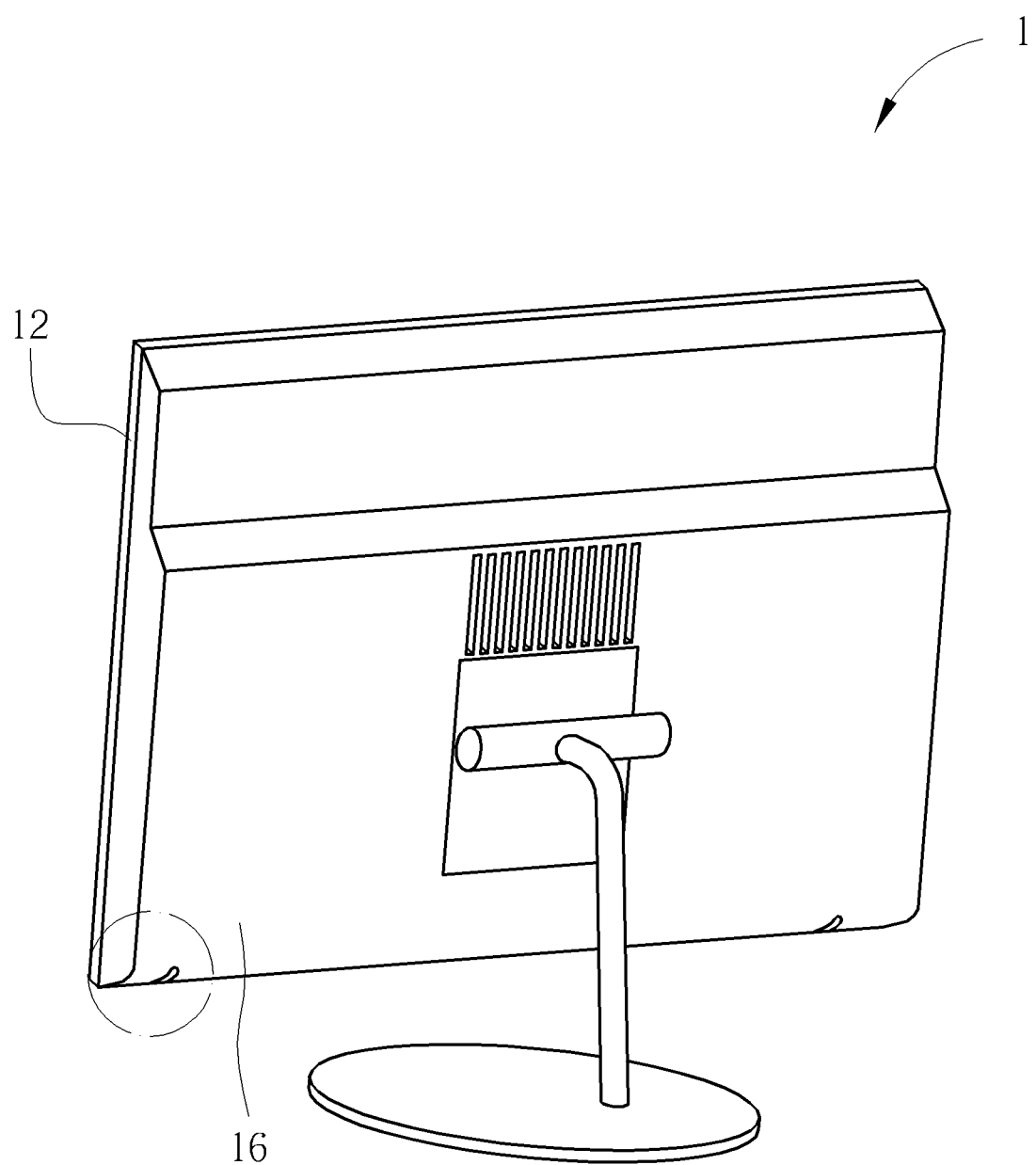
FIG. 1 is a schematic diagram illustrating an assembly casing of an embodiment according to the disclosure.
Figure 2:
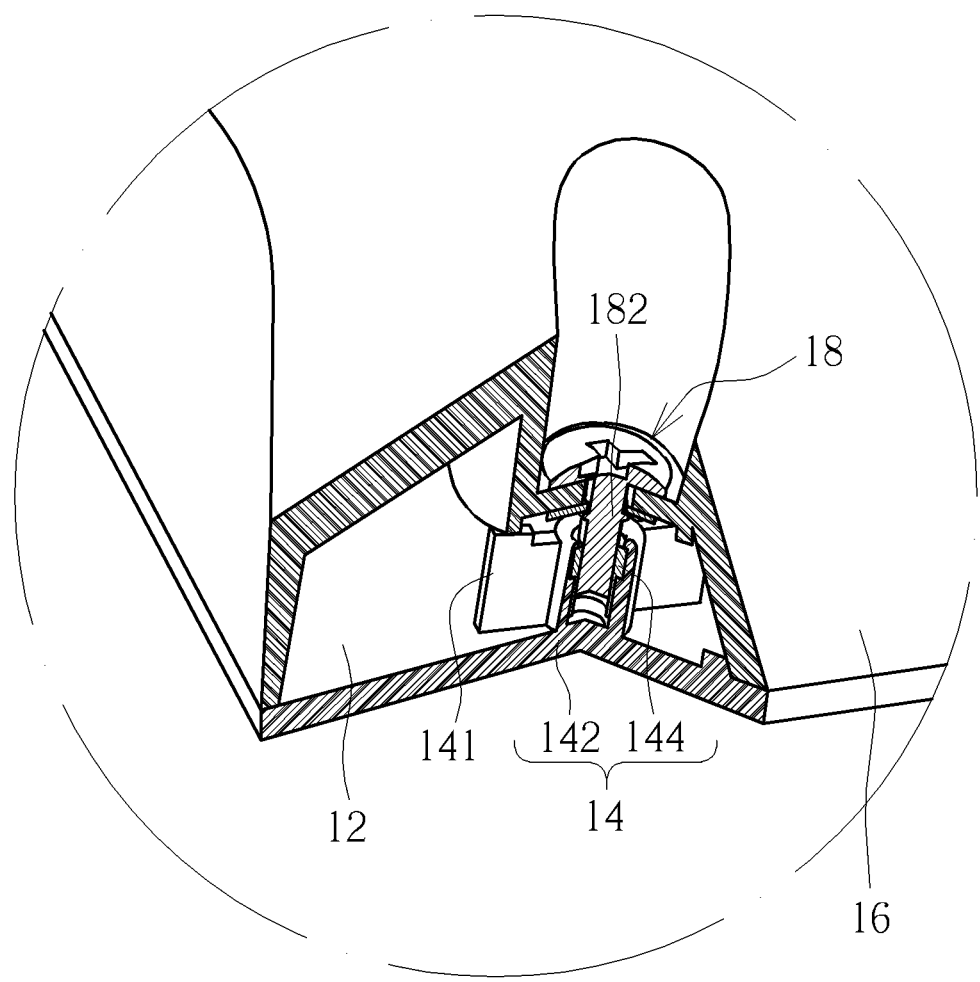
FIG. 2 is an enlarged sectional view of a portion of the assembly casing indicated by a circle A in FIG. 1.
Figure 3:
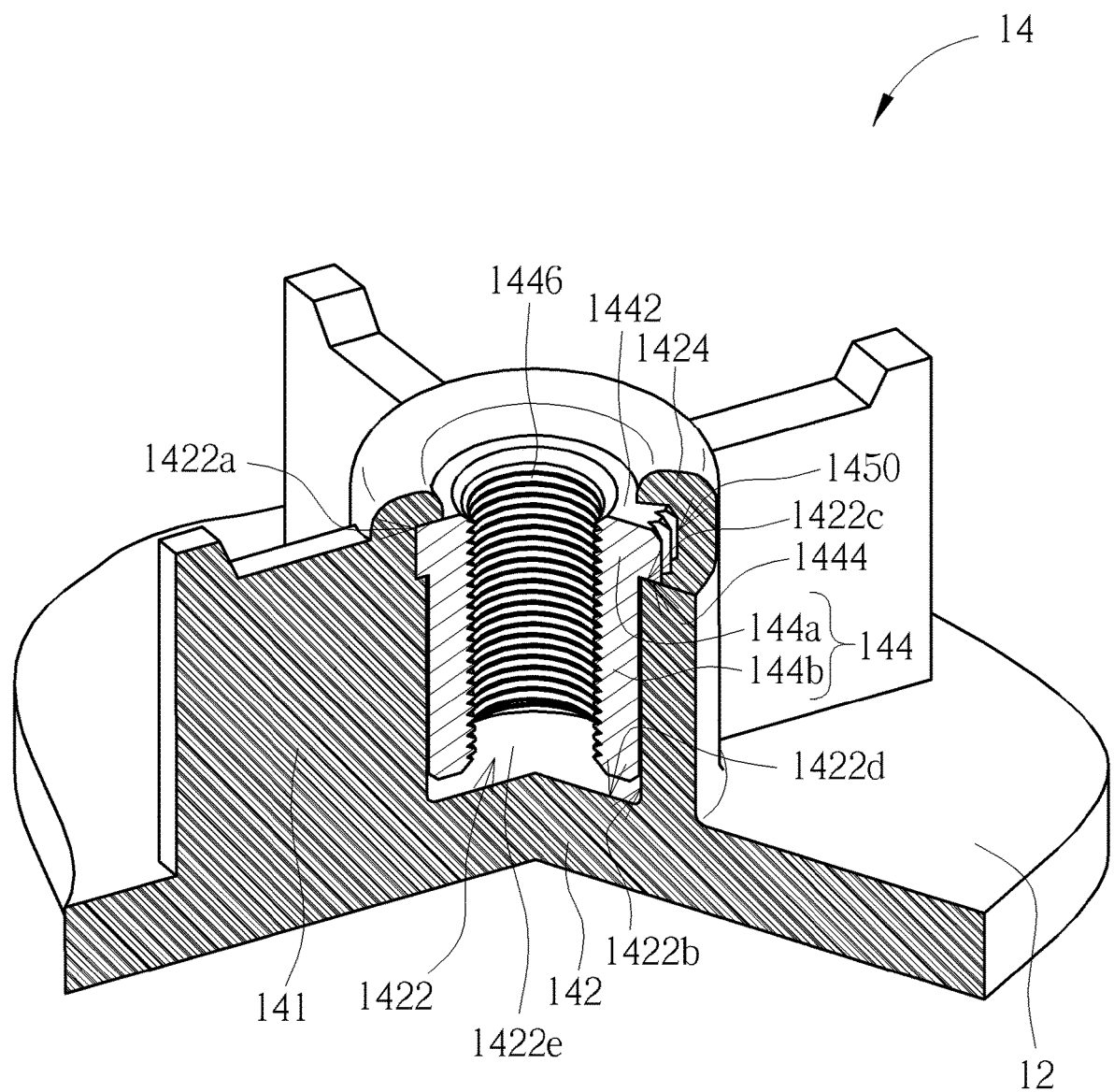
FIG. 3 is a schematic drawing illustrating an embedded connection socket of the assembly casing in FIG. 1 with being partially cut.
Figure 4:
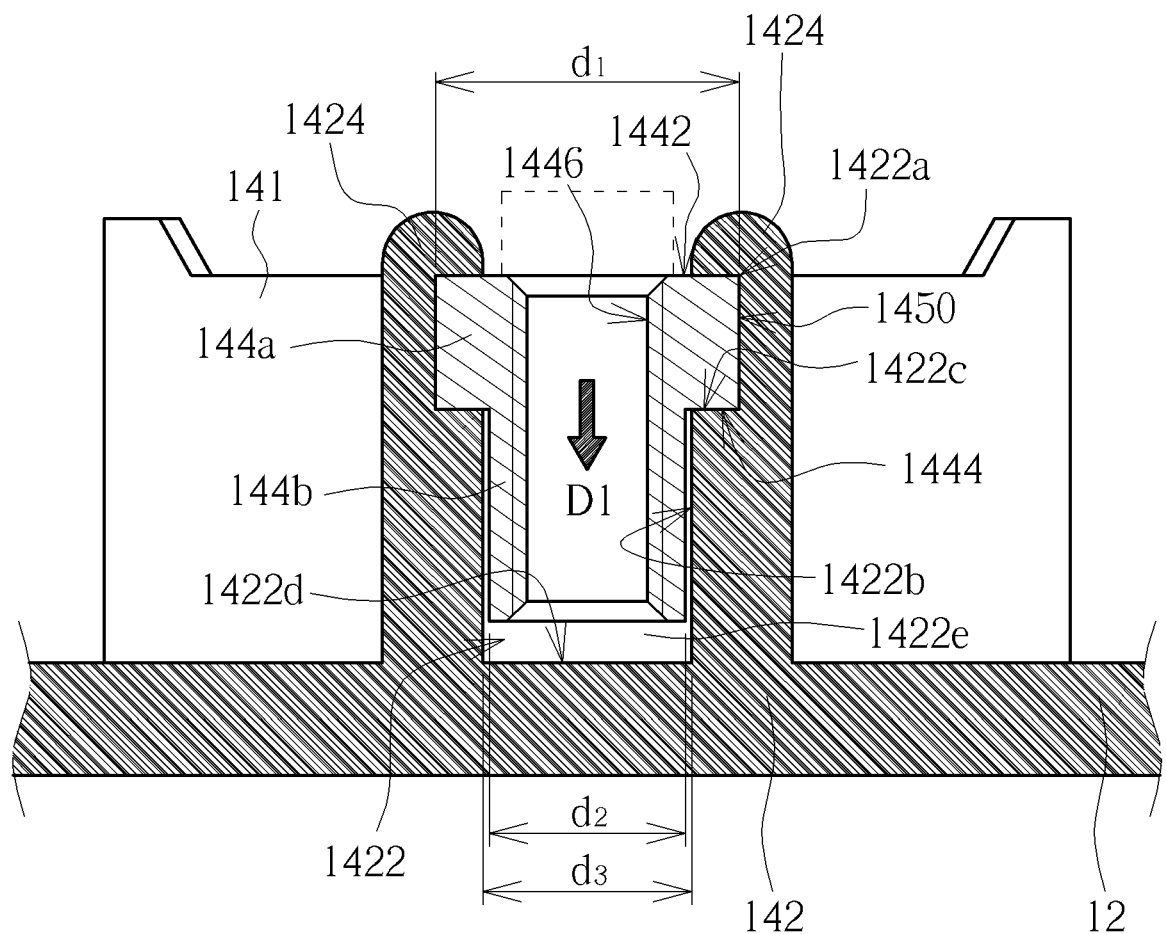
FIG. 4 is a sectional view of the embedded connection socket in FIG. 3.
Figure 5:
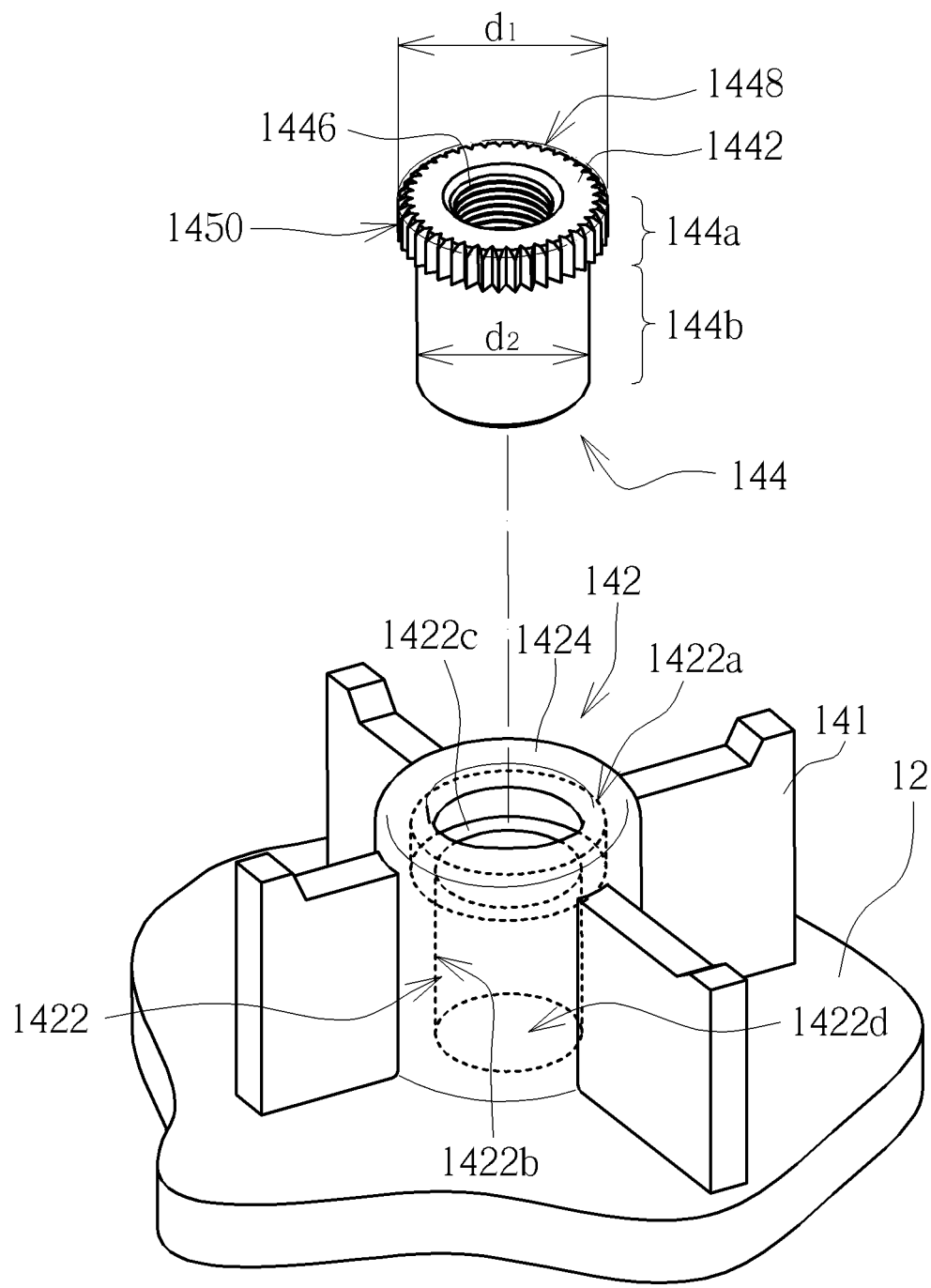
FIG. 5 is an exploded view of the embedded connection socket in FIG. 3.

Please refer to FIG. 1 and FIG. 2. FIG. 1 is a schematic diagram illustrating an assembly casing 1 of an embodiment according to the disclosure; therein, the assembly casing 1 is but not limited to be a casing of a display. FIG. 2 is an enlarged sectional view of a portion of the assembly casing 1 indicated by a circle A in FIG. 1. The assembly casing 1 includes a first casing 12, an embedded connection socket 14, a second casing 16, and a second engagement structure 18. The embedded connection socket 14 is disposed on the first casing 12. The second engagement structure 18 is disposed on the second casing 16. The first casing 12 and the second casing 16 are joined by engaging the second engagement structure 18 with the embedded connection socket 14. Therein, in the embodiment, the second engagement structure 18 and the embedded connection socket 14 are joined by screw structures which are not shown in FIG. 2 for drawing simplification. Please also refer to FIGS. 3 to 5. FIG. 3 is a schematic drawing illustrating the embedded connection socket 14 partially cut. FIG. 4 is a sectional view of the embedded connection socket 14. FIG. 5 is an exploded view of the embedded connection socket 14. The embedded connection socket 14 includes a base portion 142 and an insertion part 144. The base portion 142 includes an accommodating recess 1422 (therein, a profile of an accommodating space formed by the accommodating recess 1422 is shown in dashed lines in FIG. 5) and a fixing portion 1424. The accommodating recess 1422 has an opening 1422a. The fixing portion 1424 is protrusively disposed at the opening 1422a. In other words, in a view toward the opening 1422a, the fixing portion 1424 covers a portion of the opening 1422a.

In the embodiment, the base portion 142 and the first casing 12 are structurally integrated to be formed into single part. The base portion 142 is a protrusive column around which a plurality of ribs 141 are disposed for structure enhancement; however, the disclosure is not limited thereto. The insertion part 144 includes a blocked surface 1442, a positioning structure 1444, and a first engagement structure 1446. The insertion part 144 is disposed in the accommodating recess 1422. The accommodating recess 1422 supports the insertion part 144 through the positioning structure 1444. The blocked surface 1442 is located at the opening 1422a. The fixing portion 1424 covers at least a portion of the blocked surface 1442, so that the insertion part 144 is constrained in the accommodating recess 1422 so as not to depart from the accommodating recess 1422 (or the base portion 142) through the opening 1422a. The first engagement structure 1446 is exposed through the opening 1422a. The second engagement structure 18 is engaged with the first engagement structure 1446, so that the first casing 12 and the second casing 16 are joined. For accomplishing the above structure configuration, the fixing portion 1424 is made of thermoplastic material. After the insertion part 144 is inserted into the accommodating recess 1422 through the opening 1422a, the fixing portion 1424 is formed by heating and shaping processes; the details therefor will be described later. Furthermore, in the embodiment, the fixing portion 1424 and the accommodating recess 1422 are made of the same material, but the disclosure is not limited thereto.

Furthermore, in the embodiment, the fixing portion 1424 is disposed in a circular configuration and surrounds the opening 1422a, but the disclosure is not limited thereto. For example, the fixing portion 1424 is partially formed at the edge of the opening 1422a (e.g. the fixing portion 1424 is disposed corresponding to one or more edge segments of the opening 1422a) and also can block the blocked surface 1442 for preventing the insertion part 144 from departing the accommodating recess 1422 (or the base portion 142) from through the opening 1422a.

Further, in the embodiment, the insertion part 144 as a whole is a column and has an extension direction D1 (indicated by an arrow in FIG. 2, FIG. 4 and FIG. 5); i.e. the insertion part 144 as a whole extends in the extension direction D1. The insertion part 144 has a circumference surface 1448 relative to the extension direction D1. The insertion part 144 also has a joining structure 1450 formed on the circumference surface 1448 and adjacent to the blocked surface 1442. The joining structure 1450 has a plurality of grooves which are adjacent to the blocked surface 1442 and extend across the circumference surface 1448 in the extension direction D1; however, the disclosure is not limited thereto. For example, the grooves extend from the blocked surface 1442 in a spiral path surrounding the extension direction D1. In practice, the grooves can be formed by a rolling process, a cutting process or other forming methods. A portion of the inner sidewall of the accommodating recess 1422 corresponding to the joining structure 1450 is joined with the joining structure 1450, so that the insertion part 144 will not rotate relative to the extension direction D1. Therefore, the insertion part is fixed by the base portion 142 in both the extension direction D1 and directions parallel the extension direction D1. The structural feature functions fixing the insertion part 144 and supporting and transferring force (e.g. a joining force produced due to the engagement of the second engagement structure 18 with the first engagement structure 1446).

Furthermore, in practice, the joining structure 1450 is not limited to spread over the entire circumference surface 1448 (e.g. only formed on the circumference surface 1448 within a circumferential angle relative to the extension direction D1, or extending from the blocked surface 1442 in the extension direction D1 but not across the circumference surface 1448). Further, the joining structure 1450 also can be realized by any structure capable of engaging with the accommodating recess 1422. It is added that in the embodiment, the joining structure 1450 spreads over the entire circumference surface 1448; i.e. the whole circumference surface 1448 forms the joining structure 1450. So the circumference surface 1448 is indicated only in FIG. 5 by a circle in center line for representing the projection of the circumference surface 1448 on the blocked surface 1442. Furthermore, in the embodiment, the circumference surface 1448 can be read by directly referring to the joining structure 1450. In addition, for simplifying the profile of the accommodating recess 1422 in FIG. 5, the accommodating recess 1422 is shown without the structure details of the portion of the accommodating recess 1422 engaging with the joining structure 1450 (which also applies to FIGS. 6-8).

Furthermore, in the embodiment, the insertion part 144 includes a joining portion 144a and a positioning portion 144b. The joining portion 144a and the positioning portion 144b are arranged in the extension direction D1; that is, the positioning portion 144b is farther from the opening 1422a than the joining portion 144a. Therein, the joining portion 144a includes the blocked surface 1442 and the circumference surface 1448. The outer diameter d1 of the circumference surface 1448 (or the joining structure 1450) relative to the extension direction D1 is larger than the outer diameter d2 of the positioning portion 144b relative to the extension direction D1. For simple interpretation, the insertion part 144 of the embodiment is provided in form of a column extending in the extension direction D1 and having a step structure, so the insertion part 144 has different outer diameters. Therein, the portion of the insertion part 144 with the larger outer diameter corresponds to the joining portion 144a, and the portion of the insertion part 144 with the smaller outer diameter corresponds to the positioning portion 144b. The two portions connect with each other. The positioning structure 1444 is used for limiting a depth in which the insertion part 144 is inserted into the accommodating recess 1422. In the embodiment, the positioning structure 1444 is a positioned surface, located between the joining portion 144a and the positioning portion 144b, i.e. formed by the step structure (i.e. the surface of the joining portion 144a protruding out of the positioning portion 144b). The positioned surface is perpendicular to the extension direction D1. Correspondingly, the accommodating recess 1422 has a sidewall surface 1422b, a supporting surface 1422c, and a recess bottom surface 1422d. The supporting surface 1422*c* protrudes out of the sidewall surface 1422*b*. The accommodating recess 1422 supports the insertion part 144 by the positioned surface abutting against the supporting surface 1422*c*, for blocking the insertion part 144 from moving deeper in the accommodating recess 1422. Therein, the recess bottom surface 1422*d* and the lower end surface of the insertion part 144 form a gap 1422*e* (or space) therebetween.

In principle, it is practicable that the positioned surface just needs to be non-parallel with the extension direction D1 for achieving the effect of the accommodating recess 1422 blocking the insertion part 144 from moving deeper in extension direction D1 in the accommodating recess 1422. Hence, in practice, the positioned surface is not limited to a flat surface. The positioned surface can be a curved surface or a combination of a flat surface and a curved surface on condition that the supporting surface 1422*c* can apply a reaction force parallel to the extension direction D1 to the positioned surface for blocking the insertion part 144 from moving deeper in the accommodating recess 1422. Furthermore, in the embodiment, the profiles of the supporting surface 1422*c* and the positioned surface are the same, so that the supporting surface 1422*c* and the positioned surface can maintain a larger contact area, which is conducive to the supporting surface 1422*c* blocking the positioned surface; however, the disclosure is not limited thereto. Furthermore, in practice, the positioning structure 1444 (e.g. the above positioned surface) can be disposed at several locations of the insertion part 144. In addition, in the embodiment, the positioning structure 1444 and the supporting surface 1422*c* individually are disposed in a circular configuration, but the disclosure is not limited thereto. For example, the positioning structure 1444 and the supporting surface 1422*c* are partially formed on the insertion part 144 and the accommodating recess 1422 respectively.

Furthermore, the portion of the accommodating recess 1422 corresponding to the positioning portion 144*b* slidably close-fits with the positioning portion 144*b* in the extension direction D1, so that the insertion part 144 is fixed in the accommodating recess 1422 in directions perpendicular to the extension direction. Therein, the slidably close-fitting of the positioning portion 144*b* with the accommodating recess 1422 means that the positioning portion 144*b* is disposed in the accommodating recess 1422 corresponding to the above-mentioned portion in a loose fitting but the positioning portion 144*b* and the accommodating recess 1422 still maintain a fitting closeness thereof in a certain degree. In other words, for the positioning portion 144*b*, the positioning portion 144*b* can move relative to the accommodating recess 1422 in the extension direction D1 with an acceptable true position tolerance in engineering for the position of the positioning portion 144*b* on a plane perpendicular to the extension direction D1; therein, the acceptable true position tolerance usually depends on limitations of production processes, product specifications, and so on. In practice, the acceptable true position tolerance can be obtained by controlling the gap of the positioning portion 144*b* and the accommodating recess 1422. In the embodiment, the acceptable true position tolerance can be obtained by controlling the outer diameter d2 of the positioning portion 144*b* and the inner diameter d3 of the accommodating recess 1422; for example, the difference between the diameters d2 and d3 is controlled to be about 0.10 mm. It is added that in the embodiment, the positioning portion 144*b* and the portion of the accommodating recess 1422 corresponding to the positioning portion 144*b* individually are provided with a round column profile, so, for the positioning portion 144*b*, the abovementioned slidably close-fitting also allows the positioning portion 144*b* to rotate about the extension direction D1 relative to the accommodating recess 1422, but the disclosure is not limited thereto.

Furthermore, in the embodiment, the first engagement structure 1446 includes a threaded hole passing through the insertion part 144 in the extension direction D1 and exposed through the opening 1422*a*. Thereby, the embedded connection socket 14 joins the first casing 12 and the second casing 16 through the threaded hole of the first engagement structure 1446. Correspondingly, the second engagement structure 18 includes a screw 182 rotatably disposed on the second casing 16. The screw 182 matches with the threaded hole of the first engagement structure 1446. In the embodiment, the screw 182 is constrained by a holding part 184 fixed on the second casing 16, so that the screw 182 can rotate only relative to the second casing 16 (substantially about the extension direction D1); however, the disclosure is not limited thereto. Thereby, the second engagement structure 18 and the first engagement structure 1446 are engaged by the screw 182 screwing in the threaded hole of the first engagement structure 1446, so that the first casing 12 and the second casing 16 are joined. In practice, the above engagement structures 1446 and 18 can be switched to be disposed. For example, the first engagement structure 1446 includes a threaded rod (e.g. protruding out of the blocked surface 1442 in the extension direction D1), and the second engagement structure 18 includes a nut correspondingly. Thereby, the second engagement structure 18 and the first engagement structure 1446 also can be engaged by the nut screwing on the threaded rod.

Furthermore, in the embodiment, the insertion part 144 is a column extending in the extension direction D1, so the blocked surface 1442 is located at an end surface of the column; however, the disclosure is not limited thereto. For example, the end surface (of which the position is indicated by dashed lines in FIG. 4) of the insertion part 144 protrudes out or aligning with the fixing portion 1424, which can protect the fixing portion 1424 from damage due to interfering with other members to influence the fixing of the fixing portion 1424 to the insertion part 144. In this case, the blocked surface 1442 of the insertion part 144 is equivalent to another step structure.

Figure 6:
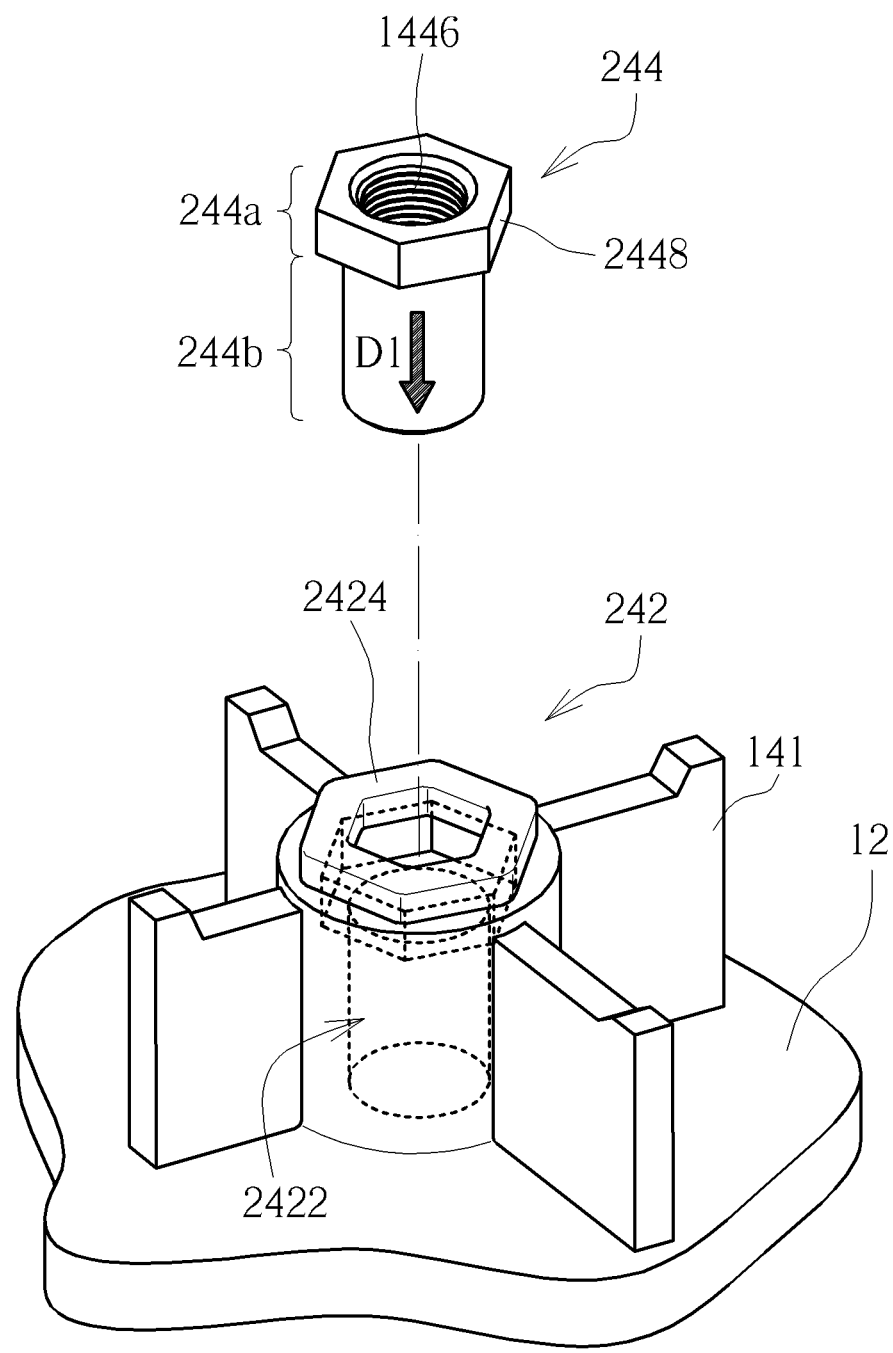
FIG. 6 is an exploded view of a base portion and an insertion part according to another embodiment.
Figure 7:
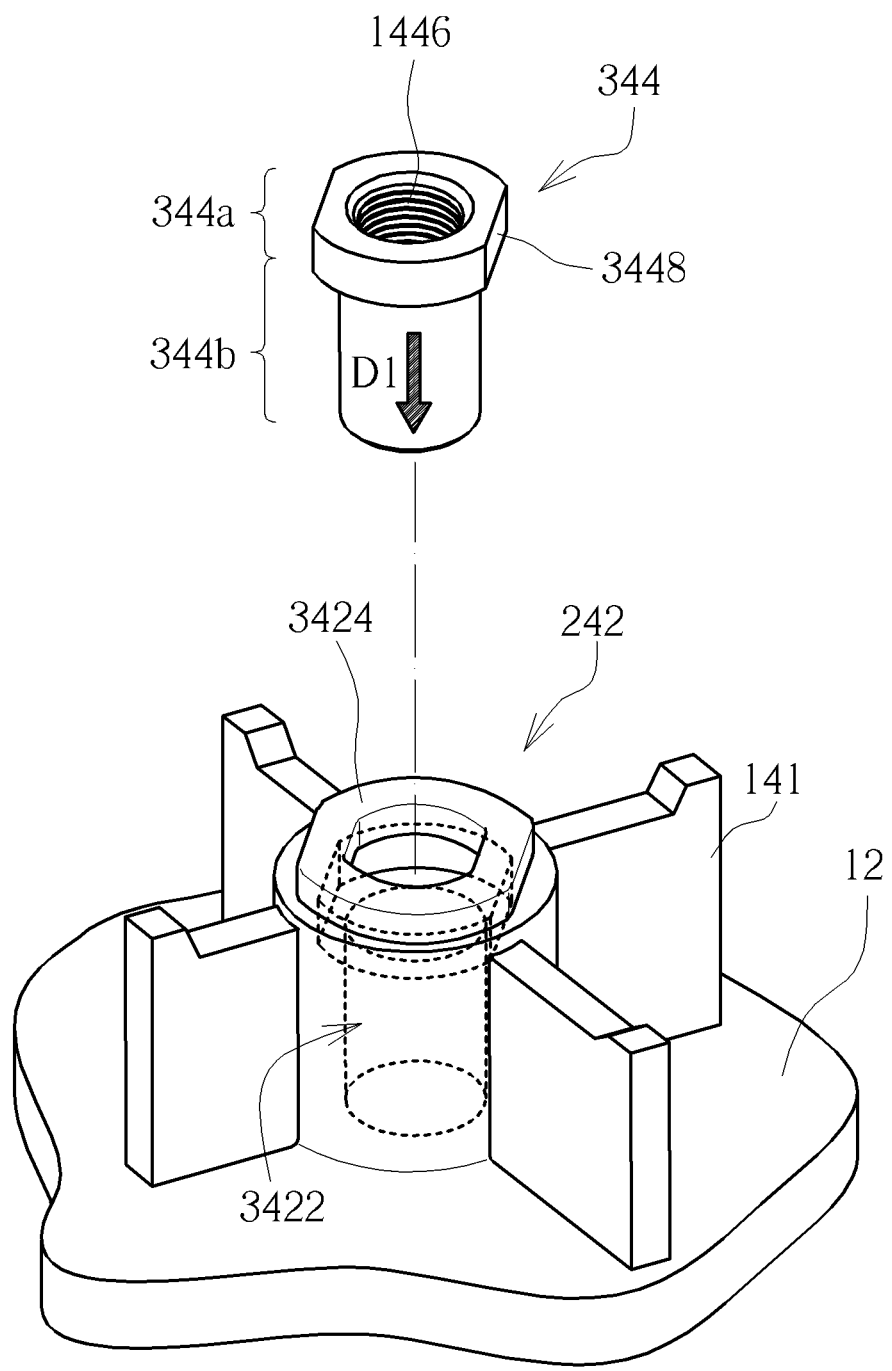
FIG. 7 is an exploded view of a base portion and an insertion part according to another embodiment.
Figure 8:
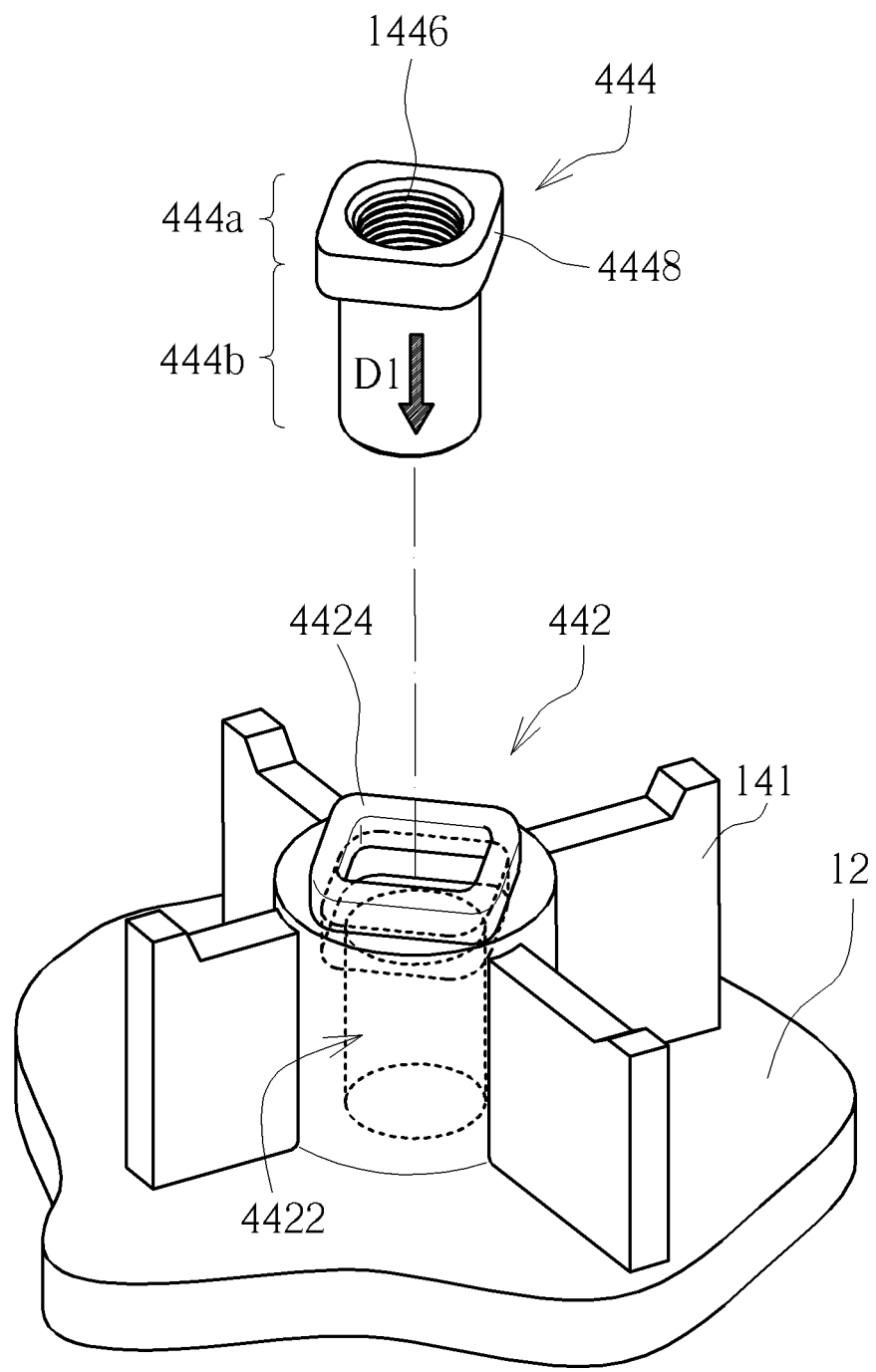
FIG. 8 is an exploded view of a base portion and an insertion part according to another embodiment.

Furthermore, in the embodiment, the joining portion 144*a* of the insertion part 144 is a round column and therefore has a circle sectional profile perpendicular to the extension direction D1; however, the disclosure is not limited thereto. Please refer to FIGS. 6-8, which are exploded views of base portions 242, 342 and 442 with insertion parts 244, 344 and 444 respectively. The insertion parts 244, 344 and 444 are substantially structurally equal to the insertion part 144. For other descriptions about the insertion parts 244, 344 and 444 and the base portions 242, 342 and 442, please refer to the relevant descriptions about the insertion part 144 and the base portion 142, which will not be repeated. Each of the joining portions 244*a*, 344*a* and 444*a* of the insertion parts 244, 344 and 444 has a non-circular sectional profile perpendicular to the extension direction D1 (also indicated by arrows in FIGS. 6-8). Portions of the accommodating recesses 2422, 3422 and 4422 of the base portions 242, 342 and 442 corresponding to the joining portions 244*a*, 344*a* and 444*a* match with the joining portions 244*a*, 344*a* and 444*a* respectively for preventing the insertion parts 244, 344 and 444 from rotating. Therein, the profiles of the accommodating spaces formed by the accommodating recesses 2422, 3422 and 4422 are shown in dashed lines in FIGS. 6-8. When the joining portions 244*a*, 344*a* and 444*a* and the accommodating recesses 2422, 3422 and 4422 are joined, the insertion parts 244, 344 and 444 are fixed and cannot rotate. As shown by FIG. 6, the non-circular sectional profile of the joining portion 244a of the insertion part 244 is a hexagon. As shown by FIG. 7, the non-circular sectional profile of the joining portion 344a of the insertion part 344 is a circle with a portion cut off. As shown by FIG. 8, the non-circular sectional profile of the joining portion 444a of the insertion part 444 is a quadrilateral with four round angles. The fixing portions 2424, 3424 and 4424 of the insertion parts 244, 344 and 444 are provided with a hexagonal profile, a circle profile with a portion cut off, and a quadrilateral profile respectively; however, the disclosure is not limited thereto. For example, the fixing portions 2424, 3424 and 4424 are still provided with circle profiles, which also can effectively cover the insertion parts 244, 344 and 444. The above are just examples, and the non-circular sectional profile of the disclosure is not limited thereto and for example can be ellipses, other polygons or combinations of partial segments of the above profiles. The joining portions 244a, 344a and 444a individually are not symmetric relative to the extension direction D1, so when the joining portions 244a, 344a and 444a are accommodated in the accommodating recesses 2422, 3422 and 4422, it is unnecessary to form structures like the joining structure 1450 on circumference surfaces 2448, 3448 and 4448 of the joining portions 244a, 344a and 444a for achieving the un-rotating effect; however, the disclosure is not limited thereto. For example, the circumference surfaces 2448, 3448 and 4448 of the joining portions 244a, 344a and 444a thereon form structures like the joining structure 1450 leading to an enhancement of the joining strength of the joining portions 244a, 344a and 444a with the accommodating recesses 2422, 3422 and 4422.

Furthermore, a matching of non-circular sectional profile itself has a feature of rotation prevention, so in practice, even if the joining strength of the circumference surfaces 2448, 3448 and 4448 of the joining portions 244a, 344a and 444a with the accommodating recesses 2422, 3422 and 4422 respectively is insufficient, the insertion parts 244, 344 and 444 are still be prevented from rotating. Furthermore, in practice, the joining portions 244a, 344a and 444a and the accommodating recesses 2422, 3422 and 4422 can be assembled by the same way as the positioning portion 144b slidably close-fits with the accommodating recess 1422, which also can perform a positioning effect relative to the extension direction D1 on the insertion parts 244, 344 and 444 and an effect of preventing the insertion parts 244, 344 and 444 from rotating. In addition, for the above embodiments, the positioning portions 244b, 344b and 444b of the insertion parts 244, 344 and 444 remains columns, so the positioning portions 244b, 344b and 444b are the same as the positioning portion 144b of the insertion part 144. Therefore, for the description about the positioning portions 244b, 344b and 444b, please refer to the relevant descriptions about the positioning portion 144b, which will not be repeated. In addition, the structural feature capable of preventing the joining portions 244a, 344a and 444a from rotating by using non-circular sectional profiles also can applies to the positioning portions 244b, 344b and 444b and the positioning portion 144b as well.

Furthermore, the insertion part 144 in the abovementioned embodiment is a column with a step structure. A protrusive radial plane formed by the step structure is taken as the positioning structure 1444 (or the positioned surface thereof); however, the disclosure is not limited thereto. Please refer to FIG. 9, which is a schematic diagram illustrating a combination of an insertion part 544 and a base portion 542 with being partially cut according to another embodiment. The insertion part 544 is a column, of which two end surfaces function as a blocked surface 5442 and a positioning structure 5444 of the insertion part 544. Correspondingly, the base portion 542 includes an accommodating recess 5422. The accommodating recess 5422 has a sidewall surface 5422b, a supporting surface 5422c, and a recess bottom surface 5422d. The supporting surface 5422c protrudes out of the sidewall surface 5422b. The accommodating recess 5422 supports the insertion part 544 by the positioning structure 5444 abutting against the supporting surface 5422c for blocking the insertion part 544 from moving deeper in the accommodating recess 5422. Therein, a recess bottom surface 5422d and the positioning structure 5444 (i.e. the lower surface of the insertion part 544) remains a gap 5422e (or space) therebetween. Therefore, the insertion part 544 does not use a step structure but the lower end surface of the column as the positioning structure 5444, which also can perform an effect of limiting the depth of the insertion part 544 inserted in the accommodating recess 5422.

Figure 9:
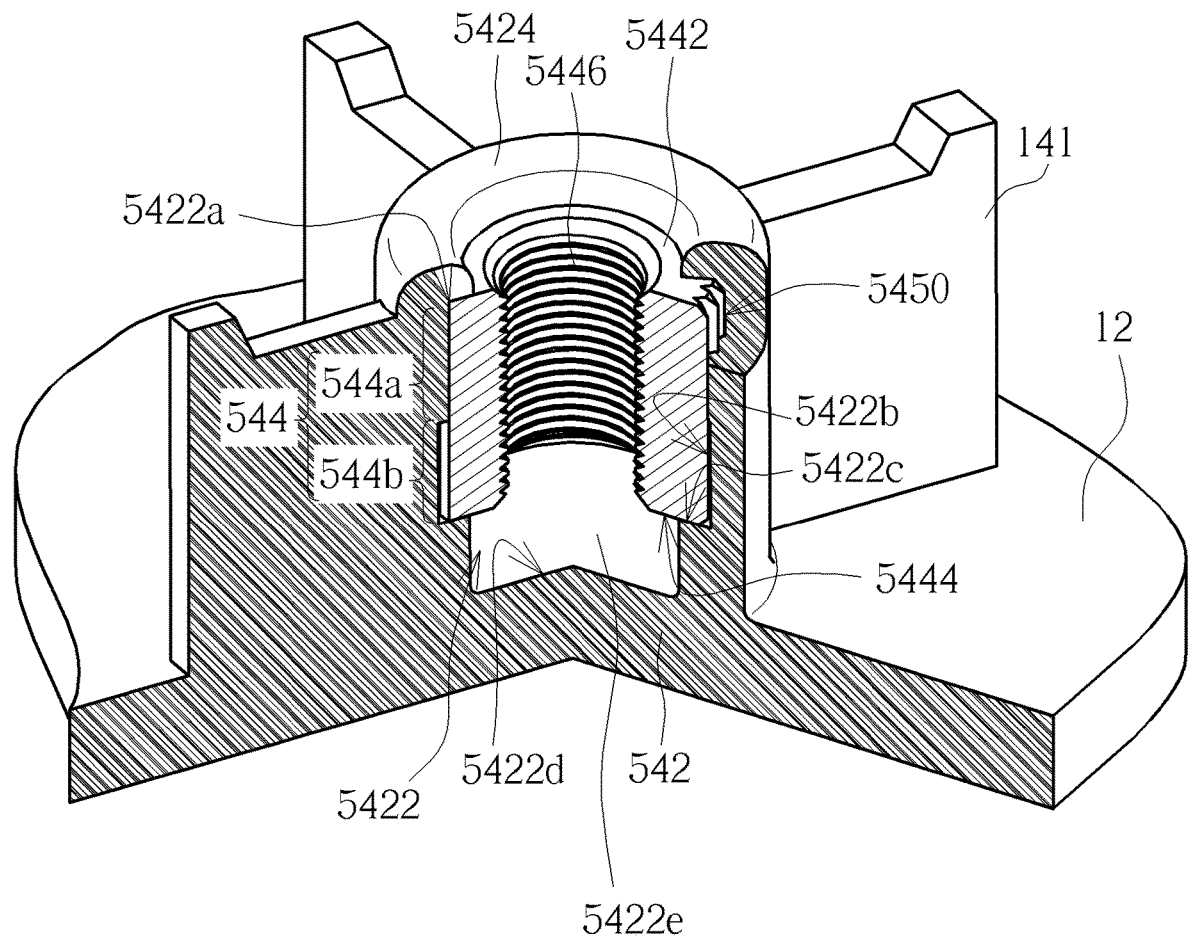
FIG. 9 is a schematic diagram illustrating a combination of an insertion part and a base portion with being partially cut according to another embodiment.

Furthermore, in the embodiment, a joining structure 5450 (e.g. a structure like the joining structure 1450 of the insertion part 144 but not limited thereto) is disposed with spreading over the circumference surface of the insertion part 544 relative to the extension direction D1. According to various joining methods (i.e. for joining the joining structure 5450 with the accommodating recess 5422), the joining range of the joining structure 5450 with the accommodating recess 5422 may be different in the extension direction D1. In the embodiment, for example, a partial material at the opening 5422a of the base portion 542 is heated to form the fixing portion 5424 and partially flows between the joining structure 5450 and the inner sidewall of the accommodating recess 5422 to join the joining structure 5450 with the accommodating recess 5422. Due to material properties and heating temperatures, the material that enters between the joining structure 5450 and the inner sidewall of the accommodating recess 5422 from one end of the insertion part 544 (where the blocked surface 5442 is located) may be unable to reach the other end of the insertion part 544 (where the positioning structure 5444 is located). As shown by FIG. 9, only the joining structure 5450 adjacent to the blocked surface 5442 is joined with the accommodating recess 5422, but the disclosure is not limited thereto.

Based on the combination shown by FIG. 9, in logic, a portion of the joining structure 5450 of the insertion part 544 which is joined with the accommodating recess 5422 can be taken as a joining portion 544a, and another portion joining structure 5450 of the insertion part 544 which is not joined with the accommodating recess 5422 can be taken as a positioning portion 544b. Similarly, the positioning portion 544b also can perform a positioning effect by the fitting of the positioning portion 544b with the accommodating recess 5422. For example, the fitting of the positioning portion 544b with the accommodating recess 5422 can be like the slidably close-fitting of the positioning portion 144b with the accommodating recess 1422, but the disclosure is not limited thereto. In addition, in the embodiment, the portion of the joining structure 5450 corresponding to the positioning portion 544b is not joined with the inner sidewall of the accommodating recess 5422, so in practice, it is unnecessary to form the joining structure 5450 on the circumference surface of the positioning portion 544b, and the circumference surface of the positioning portion 544b can be remained smooth for enhancing the positioning effect on the positioning portion 544b. For other descriptions about the insertion part 544 and the base portion 542 (e.g. descriptions about the components of the first engagement structure 5446, the fixing portion 5424 and so on), Please refer to the relevant descriptions about the insertion part 144 and the base portion 142, which will not be repeated.

In addition, in the above embodiment, the insertion part 544 is supported in the accommodating recess 5422 by the supporting surface 5422c protruding out of the sidewall surface 5422b, but the disclosure is not limited thereto. Please refer to FIG. 10, which is a schematic diagram illustrating a combination of the insertion part 544 and a base portion 642 with being partially cut according to another embodiment. The base portion 642 includes an accommodating recess 6422 correspondingly. The accommodating recess 6422 has a sidewall surface 6422b and a recess bottom surface 6422d. The accommodating recess 6422 supports the insertion part 544 through the positioning structure 5444 (i.e. the lower end surface of the insertion part 544) abutting against the recess bottom surface 6422d. For other descriptions about the insertion part 544 and the base portion 642, please refer to the relevant descriptions about the insertion part 544 and the base portion 542, which will not be repeated.

Figure 10:
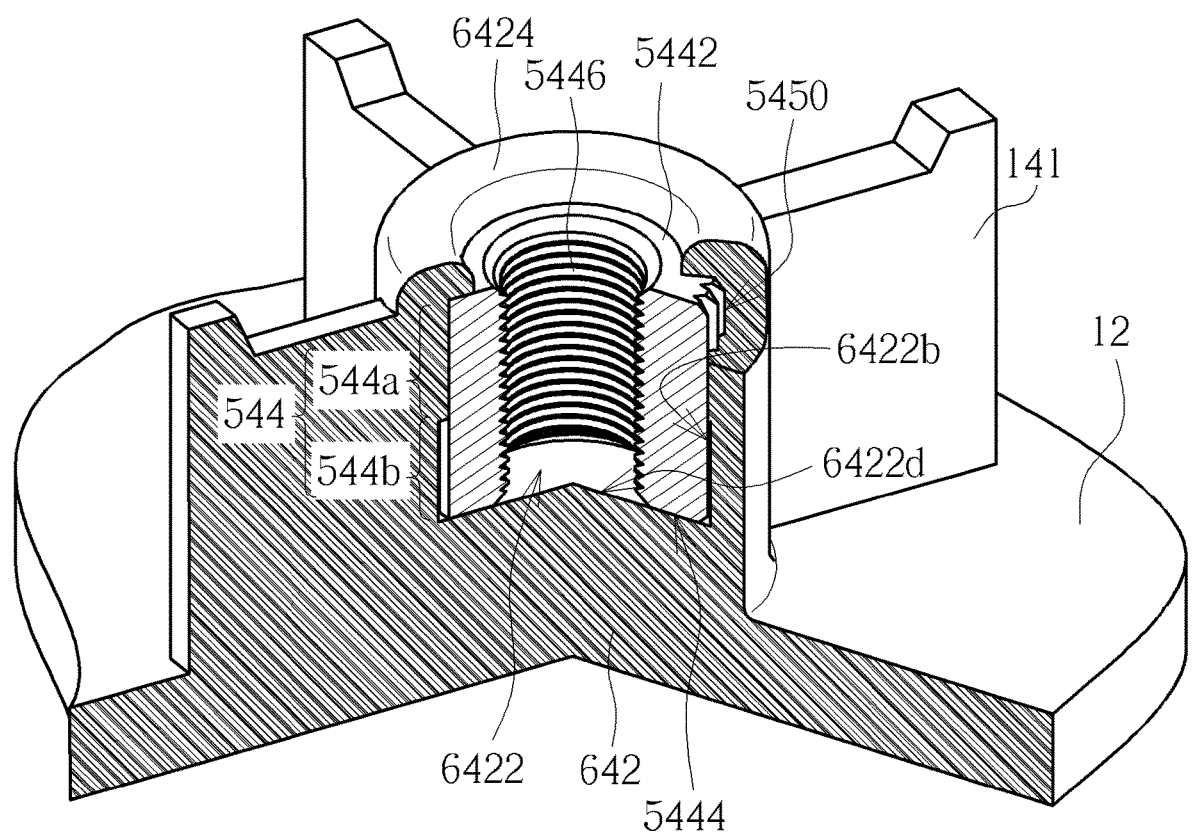
FIG. 10 is a schematic diagram illustrating a combination of an insertion part and a base portion with being partially cut according to another embodiment.

It is added that, as shown by FIG. 2 and FIG. 9, the insertion parts 144 and 544 and the recess bottom surfaces 1422d and 5422d of the accommodating recesses 1422 and 5422 form the gaps 1422e and 5442e therebetween respectively as buffer spaces for the front tip of the second engagement structure 18 (e.g. when the screw 182 is longer) to extend in for avoidance of structure interference with the recess bottom surfaces 1422d and 5422d of the accommodating recesses 1422 and 5422. If the length of the insertion parts 144 and 544 in the extension direction D1 is long enough for the second engagement structure 18, it is unnecessary to dispose buffer space between the insertion parts 144 and 544 and the recess bottom surfaces 1422d and 5422d of the accommodating recesses 1422 and 5422, so that the insertion part 544 and the accommodating recess 6422 can be disposed in the configuration as shown by FIG. 10. Furthermore, if the length of the insertion part 544 in the extension direction D1 is much longer than the depth in which the second engagement structure 18 is inserted into the insertion part 544, the first engagement structure 5446 of the insertion part 544 can be formed in the insertion part 544 without passing through the insertion part 544.

It is added that the embedded connection socket 14 (and variants including the insertion parts 244, 344, 444 and 544 and the base portions 242, 342, 442, 542 and 642) is illustrated by applying to the assembly casing 1 for joining the two objects (i.e. the first casing 12 and the second casing 16); however, the disclosure is not limited thereto. In principle, two other objects to be joined together can use an embedded connection socket according to the disclosure, which can be easily interpreted based on the above description. So it will not be illustrated by other examples.

Figure 11:
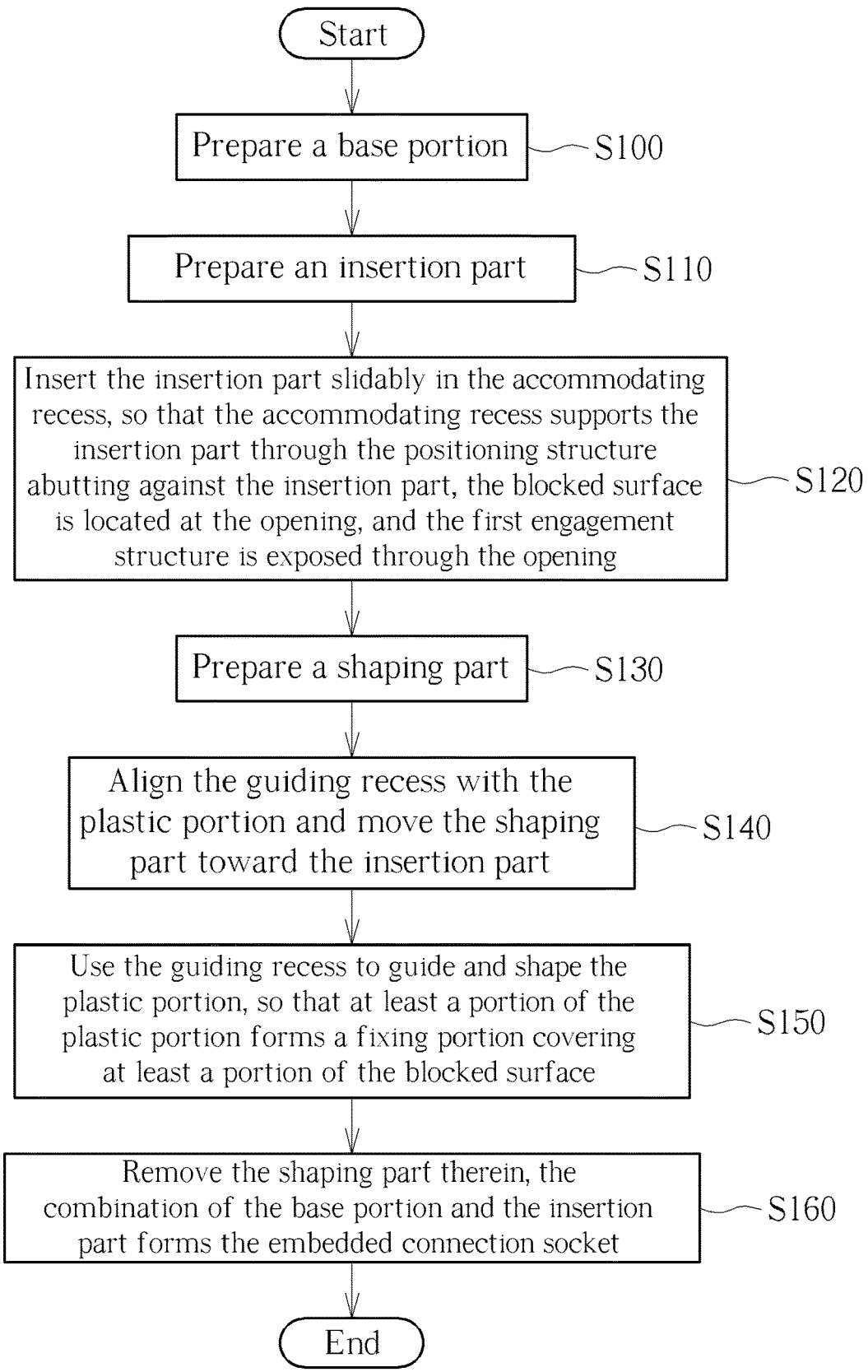
FIG. 11 is a flow chart of a method for producing an embedded connection socket of an embodiment according to the disclosure.
Figure 12:
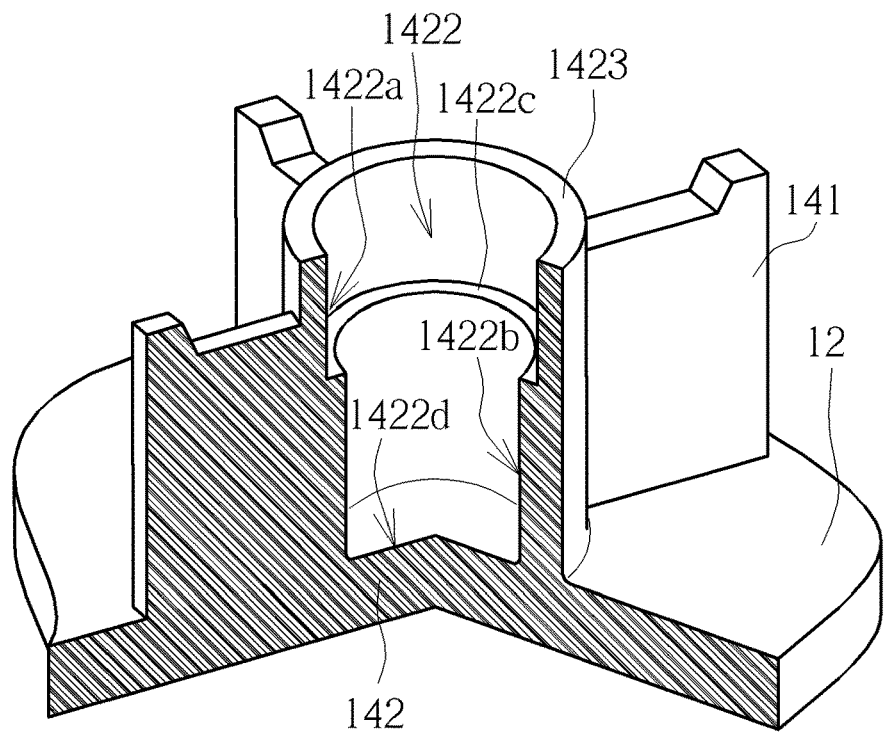
FIG. 12 is a schematic diagram illustrating a base portion with being partially cut provided according to the flow chart in FIG. 11.

Please refer to FIG. 11, which is a flow chart of a method for producing an embedded connection socket of an embodiment according to the disclosure. The embedded connection socket is used for joining two objects. For simple interpretation, the following description is based on producing the embedded connection socket 14 and directly uses the reference numbers used for the above embodiments in principle. For the descriptions about the components, please refer to the foregoing descriptions, which will not be repeated in addition. As shown by the step S100, the method is to prepare a base portion 142. The base portion 142 is disposed in a first casing 12 and includes an accommodating recess 1422 and a plastic portion 1423. The accommodating recess 1422 has an opening 1422a. The plastic portion 1423 is made of thermoplastic material and protrusively disposed at the opening 1422a, as shown by FIG. 12. In practice, the first casing 12 can be an injection part of thermoplastic material. For this case, the base portion 142 and the first casing 12 are formed in a single part, but the disclosure is not limited thereto. It is added that in the embodiment, the opening 1422a of the accommodating recess 1422 is defined relative to the plastic portion 1423. For more precisely, the opening 1422a can be distinctly shown after the plastic portion 1423 forms the fixing portion 1424 (referring to FIG. 4). In FIG. 12, the position of the opening 1422a also can be indicated by the upper edges of the ribs 141 around the base portion 142.

Figure 13:
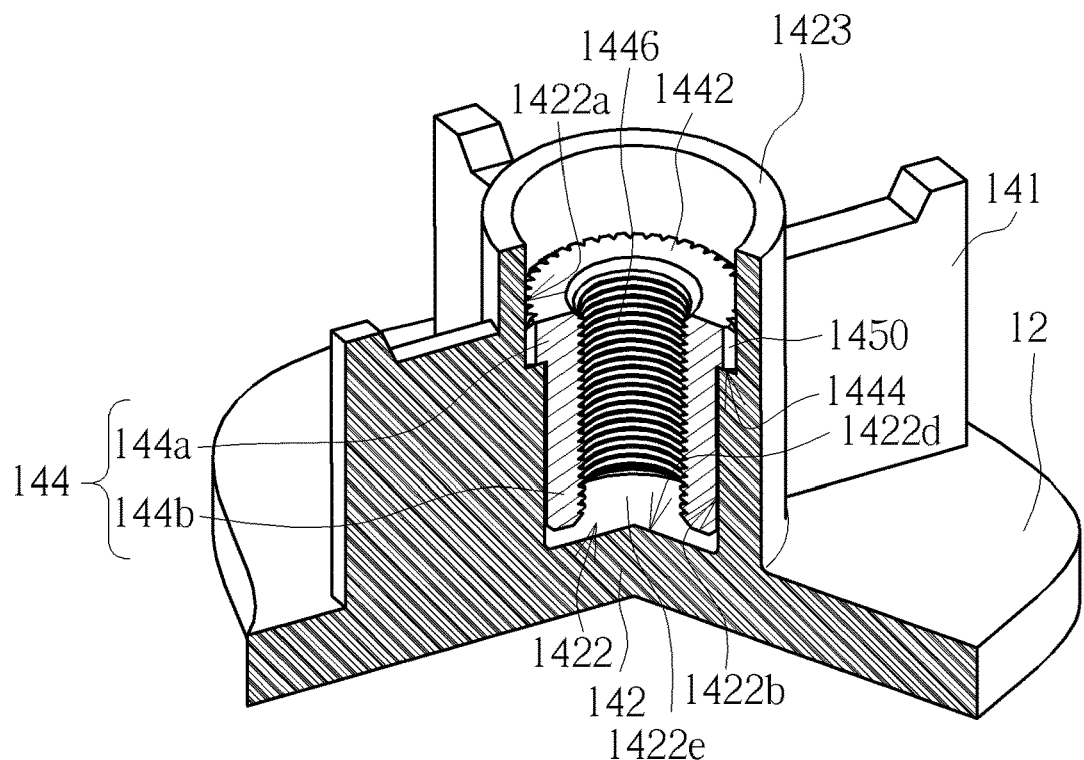
FIG. 13 is a schematic diagram illustrating an insertion part inserted into the base portion with being partially cut according to the flow chart in FIG. 11.
Figure 14:
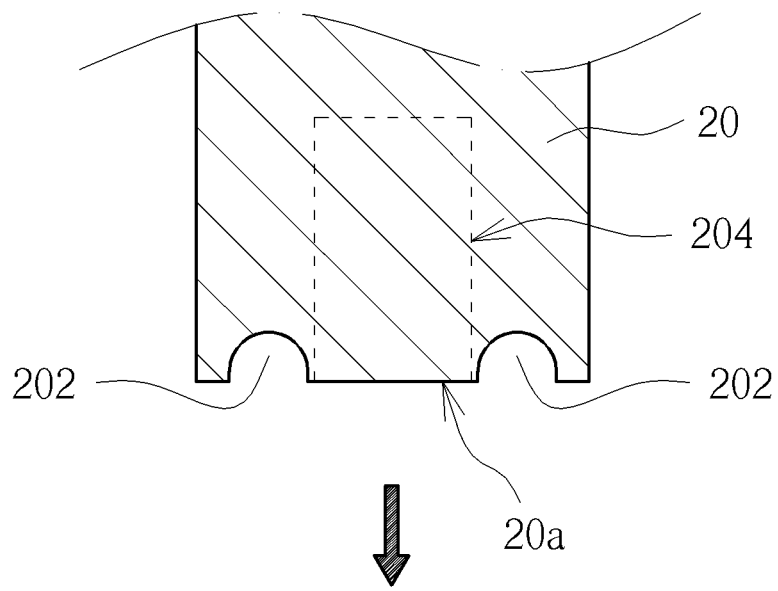
FIG. 14 is a sectional view of a shaping part, provided according to the flow chart in FIG. 11, and the insertion part inserted into the base portion.
Figure 14:
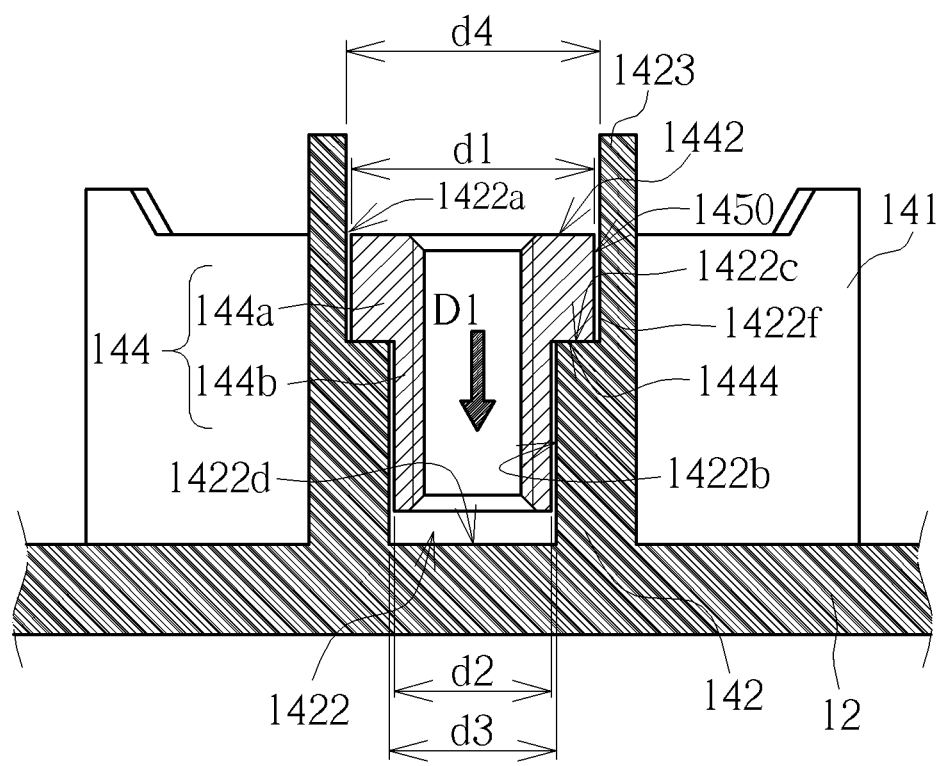

As shown by the step S110, the method is also to prepare an insertion part 144. The insertion part 144 includes a blocked surface 1442, a positioning structure 1444, and a first engagement structure 1446, shown as the insertion part 144 in FIG. 5. As shown by the step S120, the method is to insert the insertion part 144 slidably in the accommodating recess 1422, so that the accommodating recess 1422 supports the insertion part 144 through the positioning structure 1444 abutting against the insertion part 144, the blocked surface 1442 is located at the opening 1422a, and the first engagement structure 1446 is exposed through the opening 1422a, as shown by FIG. 13. At this process stage, the plastic portion 1423 is protrusive relative to the blocked surface 1442. As shown by the step S130, the method is to prepare a shaping part 20. The shaping part 20 has a guiding recess 202, as shown by FIG. 14; therein, the shaping part 20 is shown in a sectional view in FIG. 14. The guiding recess 202 corresponds to the plastic portion 1423 and therefore is provided in a form of circular profile (i.e. extending in a circle about the extension direction D1).

Figure 15:
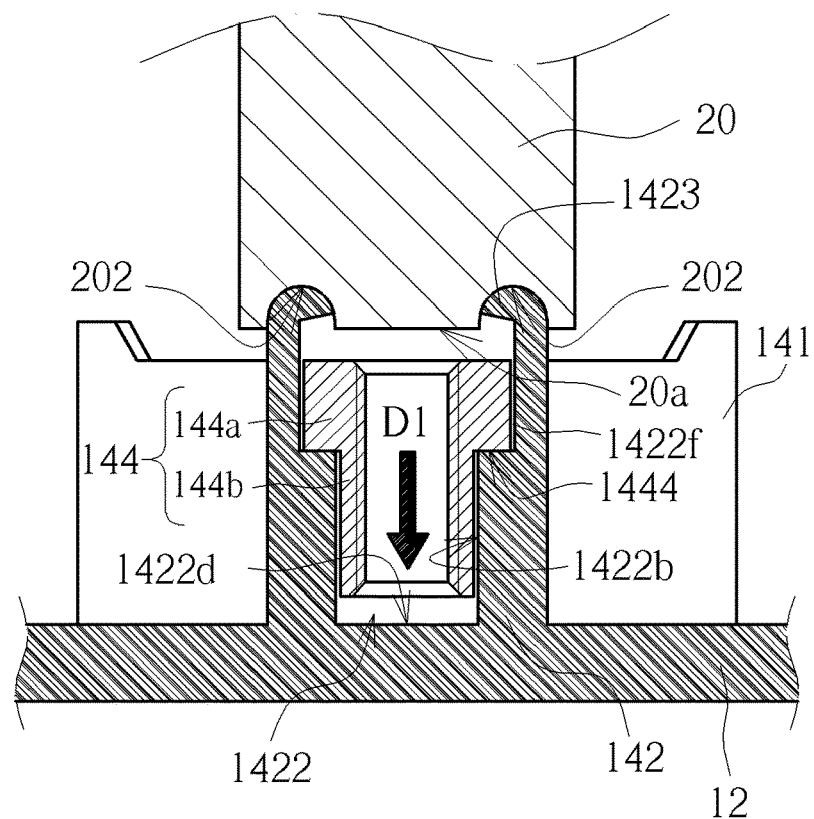
FIG. 15 is sectional view of the shaping part and a plastic portion of the base portion with being shaped by the shaping part according to the flow chart in FIG. 11.
Figure 16:
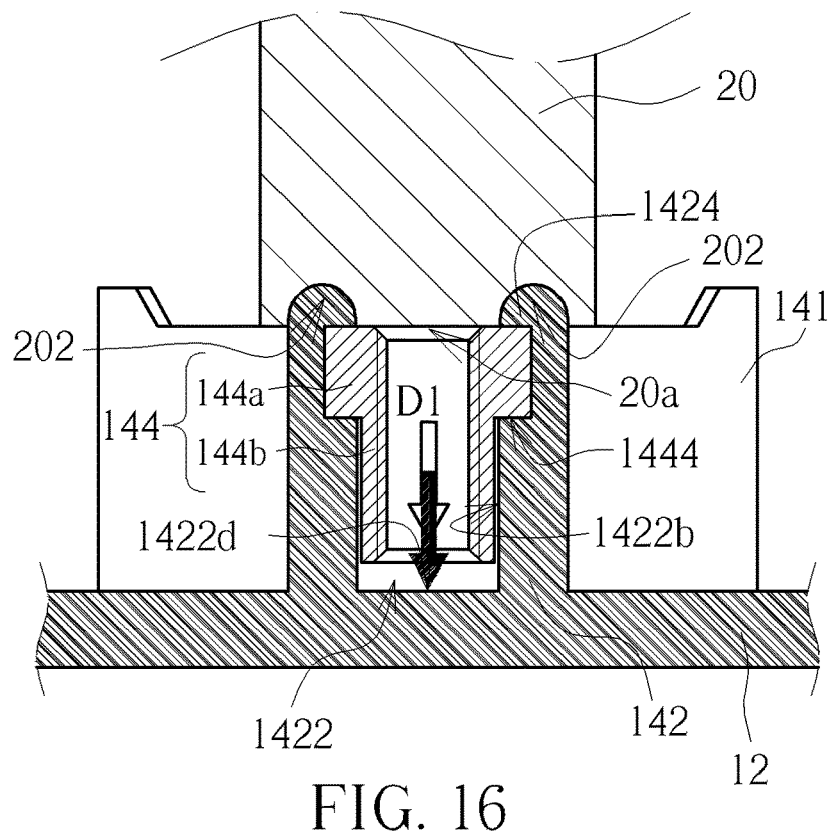
FIG. 16 is sectional view of the shaping part and the plastic portion shaped completely according to the flow chart in FIG. 11.

As shown by the step S140, the method is to align the guiding recess 202 with the plastic portion 1423 and to move the shaping part 20 toward the insertion part 144, as shown by FIG. 14; therein, the movement direction of the shaping part 20 is indicated by an arrow in the figure. As shown by the step S150, the method is to use the guiding recess 202 to guide and shape the plastic portion 1423, so that at least a portion of the plastic portion 1423 forms a fixing portion 1424 covering at least a portion of the blocked surface 1442, as shown by FIG. 15 and FIG. 16; therein, the engagement structure 1446 is still exposed through the opening 1422a. Afterward, as shown by the step S160, the method is to remove the shaping part 20. The combination of the base portion 142 and the insertion part 144 forms the embedded connection socket 14 accordingly (as shown by FIG. 3). The embedded connection socket 14 can join the first casing 12 and the second casing 14 through the engagement structure 1446. Therein, the fixing portion 1424 blocks the blocked surface 1442 so that the insertion part 144 is constrained in the accommodating recess 1422 and will not depart from the accommodating recess 1422 (or the base portion 142) through the opening 1422a.

It is added that in the embodiment, the first engagement structure 1446 is a threaded hole, so only the guiding recess 202 is formed on an end surface 20a of the shaping part 20. If the first engagement structure 1446 is a threaded rod, a relief space 204 (shown in dashed lines in FIG. 14) is also formed on the end surface 20a of the shaping part 20, so that the threaded rod can enter the relief space 204 when the shaping part 20 moves down and shapes the plastic portion 1423, which is conducive to avoidance of structural interference of the threaded rod with the shaping part 20.

Furthermore, in the embodiment, the plastic portion 1423 surrounds the opening 1422a, so in the step S150, the plastic portion 1423 is shaped into the fixing portion 1424 that also surrounds the opening 1422a; however, the disclosure is not limited thereto. For example, the plastic portion 1423 is partially formed at the edge of the opening 1422a (e.g. the plastic portion 1423 is disposed corresponding to one or more edge segments of the opening 1422a), and then the fixing portion 1424 is also partially formed at the edge of the opening 1422a correspondingly and also can block the blocked surface 1442 for preventing the insertion part 144 from departing the accommodating recess 1422. For this case, the corresponding guiding recess 202 can still remain disposed in a circle or be formed by one or more grooves correspondingly on the end surface 20a of the shaping part 20.

Furthermore, in the embodiment, the plastic portion 1423 needs to be heated to be shaped, so in the step S140, the method is to heat the guiding recess 202, for example by heating (e.g. ohmic heating) the portion of the shaping part 20 adjacent to the end surface 20a. However, the disclosure is not limited thereto. For example, by an ultrasonic heating method, the portion of the plastic portion 1423 contacting the guiding recess 202 rubs the guiding recess 202 to produce heat and then has fluidity.

Furthermore, in the embodiment, in the step S110, the insertion part 144 as a whole is a column and has an extension direction D1. The insertion part 144 includes a circumference surface 1448 and a joining structure 1450 formed on the circumference surface 1448 and adjacent to the blocked surface 1442. The joining structure 1450 includes a plurality of grooves. For the descriptions about the grooves, please refer to the foregoing descriptions, which will not be repeated in addition. In the step S120, after the insertion part 144 is inserted into the accommodating recess 1422 in the extension direction D1, the sectional profile, perpendicular to the extension direction D1, of the portion of the accommodating recess 1422 corresponding to the joining structure 1450 is larger than the sectional profile of the joining structure 150 perpendicular to the extension direction D1. In the embodiment, the insertion part 144 substantially has a circular sectional profile perpendicular to the extension direction D1, and the portion of the accommodating recess 1422 corresponding to the joining structure 1450 matches with the joining structure 1450, so the portion of the accommodating recess 1422 corresponding to the joining structure 1450 also substantially has a circular sectional profile. Therefore, as shown by FIG. 14, the inner diameter d4 of the portion of the accommodating recess 1422 corresponding to the joining structure 1450 is larger than the outer diameter d1 of the joining structure 1450, so that the joining structure 1450 can freely enter the accommodating recess 1422; that is, a gap 1422f is formed between the joining structure 1450 and the inner sidewall of the accommodating recess 1422. At least the grooves and the inner sidewall form the gap 1422f (or space) therebetween.

Therefore, in the step S150, the method is to use the guiding recess 202 to guide and shape the plastic portion 1423, so that a portion of the plastic portion 1423 enters between the joining structure 1450 and the accommodating recess 1422 (i.e. entering the gap 1422f) to join the joining structure 1450 with the accommodating recess 1422. In the embodiment, the portion of the plastic portion 1423 entering between the joining structure 1450 and the accommodating recess 1422 (i.e. the portion of the plastic portion 1423 in the gap 1422f) fills the grooves, so that the joining structure 1450 and the accommodating recess 1422 are tightly joined. It is added that the plastic portion 1423 maybe cannot fill up all of the grooves according to the fluidity of the plastic portion 1423. However, in principle, once the plastic portion 1423 enters between the joining structure 150 and the accommodating recess 1422, the joining structure 1450 and the accommodating recess 1422 will be joined for preventing the insertion part 144 from rotating about the extension direction D1. Furthermore, in practice, the fluidity of the plastic portion 1423 can be improved by controlling the heating to the plastic portion 1423 (e.g. the heating temperature), so that the plastic portion 1423 can substantially fill up all of the grooves, which is conducive to a strong joining of the joining structure 1450 with the accommodating recess 1422.

Furthermore, in the embodiment, in the step S100, the accommodating recess 1422 has a sidewall surface 1422b and a supporting surface 1422c protruding out of the sidewall surface 1422b. In the step S110, the insertion part 144 includes a joining portion 144a and a positioning portion 144b which are arranged in the extension direction D1. The joining portion 144a includes a blocked surface 1442 and a circumference surface 1448. The outer diameter d1 of the circumference surface 1448 (or the joining structure 1450) relative to the extension direction D1 is larger than the outer diameter d2 of the positioning portion 144b relative to the extension direction D1 (as shown by FIG. 14), so the insertion part 144 extends in the extension direction D1 and has a step structure. The positioning structure 1444 is a positioned surface between the joining portion 144a and the positioning portion 144b, i.e. formed by the step structure (i.e. the surface of the joining portion 144a protruding out of the positioning portion 144b). The positioned surface is perpendicular to the extension direction D1. Therefore, in the step S120, the positioned surface abuts against the supporting surface 1422c, so that the accommodating recess 1422 supports the insertion part 144. For the other descriptions about the fitting of the insertion part 144 with the accommodating recess 1422 (e.g. variants of the positioning structure 1444 and effects thereof), please refer to the relevant descriptions of the insertion part 144 in the foregoing descriptions, which will not be repeated in addition.

Furthermore, in the embodiment, in the step S120, the portion of the accommodating recess 1422 corresponding to the positioning portion 144b slidably close-fits with the positioning portion 144b in the extension direction D1, so that the insertion part 144 is fixed in the accommodating recess 1422 in directions perpendicular to the extension direction D1. For the slidably close-fitting, please refer to the relevant descriptions about the slidably close-fitting of the positioning portion 144b with the accommodating recess 1422, which will not be repeated in addition.

Furthermore, in the embodiment, in the step S110, the insertion part 144 is a column extending in the extension direction D1, so the blocked surface 1442 is located at an end surface of the column; however, the disclosure is not limited thereto. For example, the end surface (of which the position is indicated by dashed lines in FIG. 4) of the insertion part 144 protrudes out of the blocked surface 1442; correspondingly, the shaping part 20 needs to have a relief space (similar to the structure shown in dashed lines in FIG. 14) on the end surface 20a, so that the end surface of the insertion part 144 protruding out of the blocked surface 1442 can enter the relief space when the shaping part 20 moves down and shapes the plastic portion 1423, which is conducive to avoidance of structural interference with the shaping part 20.

Figure 17:
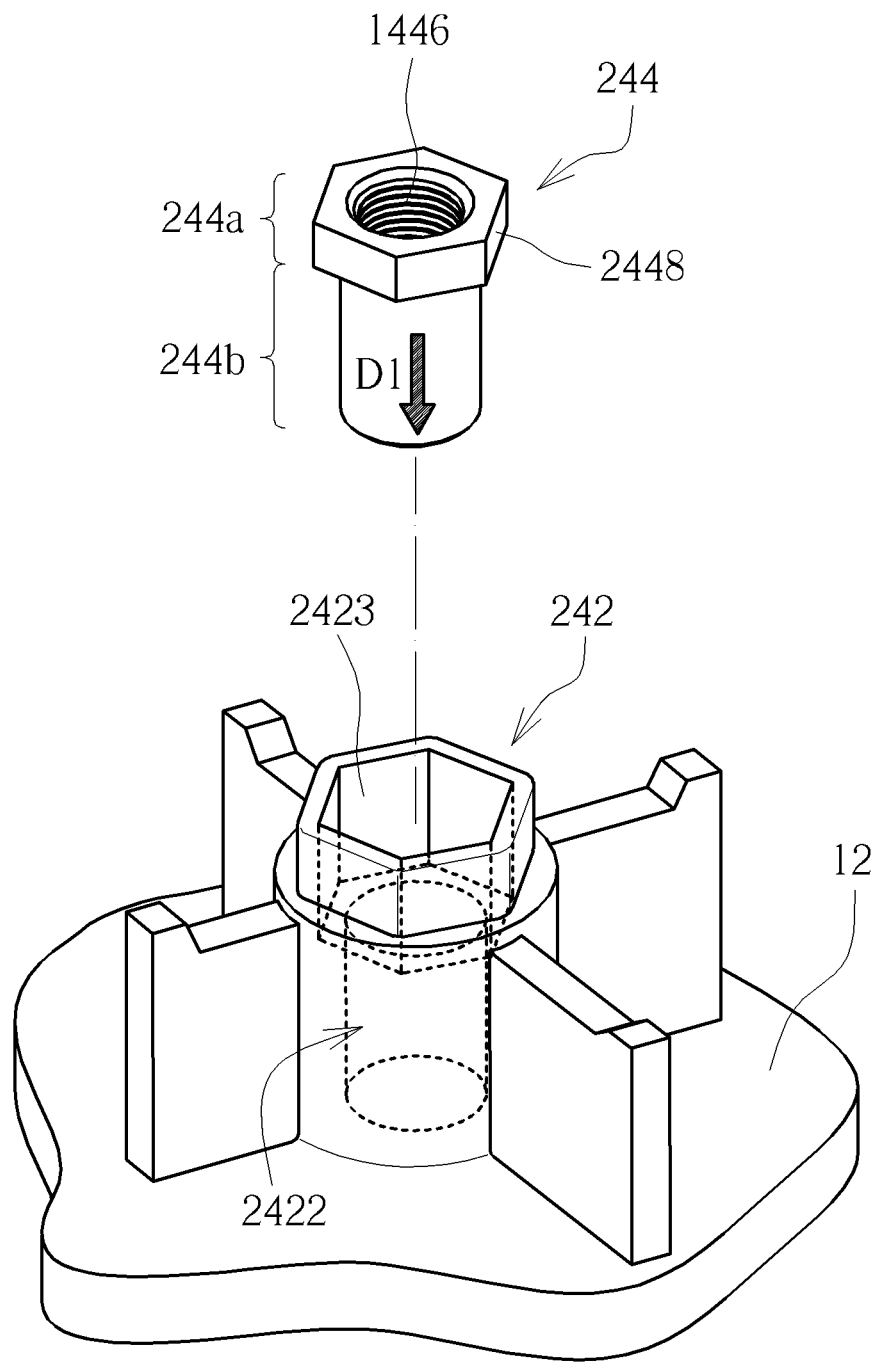
FIG. 17 is a schematic diagram illustrating the assembly of a base portion with an insertion part according to another embodiment.
Figure 18:
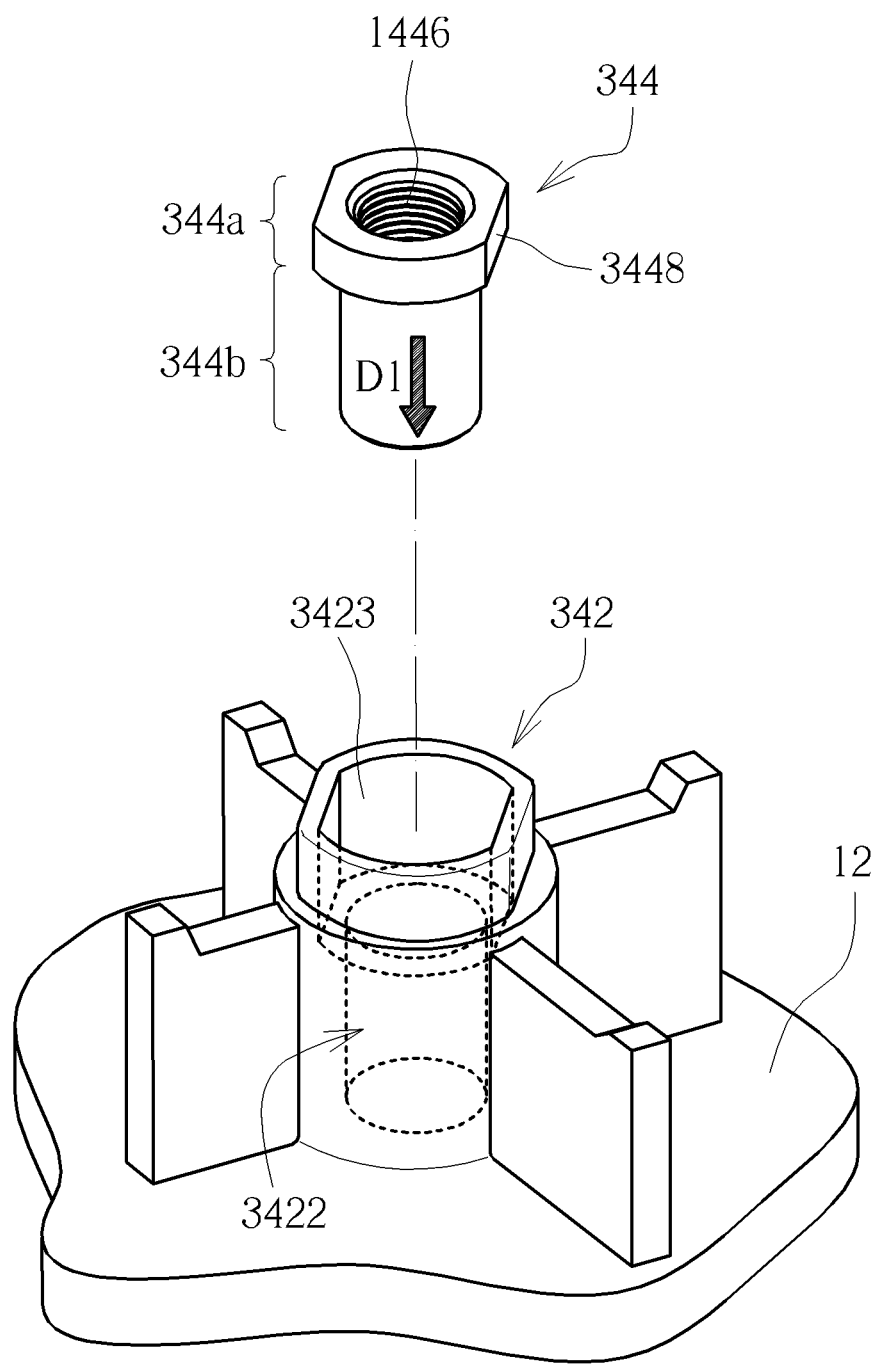
FIG. 18 is a schematic diagram illustrating the assembly of a base portion with an insertion part according to another embodiment.
Figure 19:
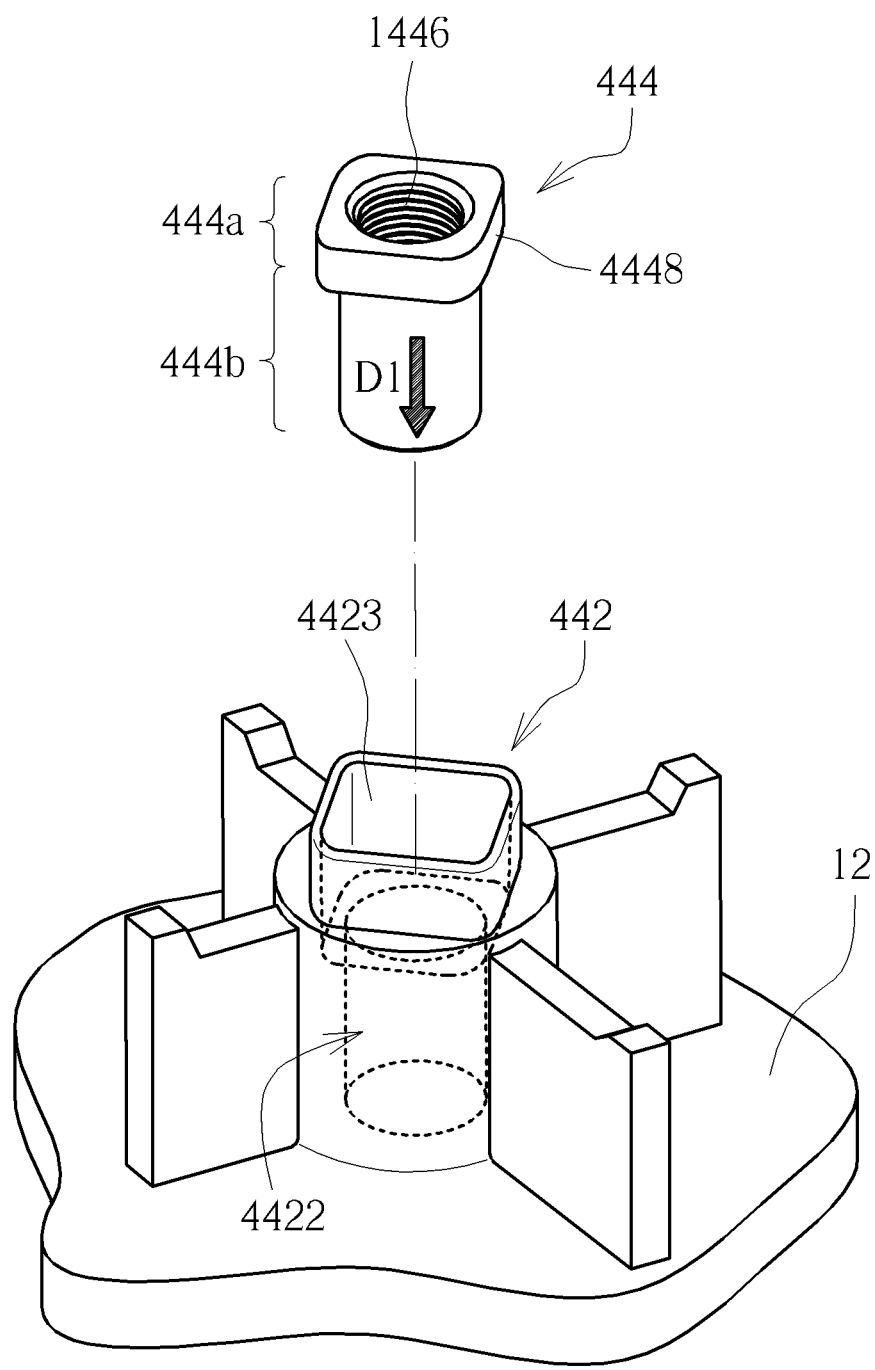
FIG. 19 is a schematic diagram illustrating the assembly of a base portion with an insertion part according to another embodiment.

Furthermore, in the embodiment, the joining portion 144*a* of the insertion part 144 is a round column, i.e. having a circular sectional profile perpendicular to the extension direction D1; however, the disclosure is not limited thereto. FIGS. 17-19 are schematic diagrams illustrating the assembly of the base portions 242, 342 and 442 with the insertion parts 244, 344 and 444 respectively according to other embodiments. FIGS. 17-19 are similar to FIGS. 6-8. The difference is that plastic portions 2423, 3423 and 4423 of the base portions 242, 342 and 442 in FIGS. 17-19 have not shaped into the fixing portions 2424, 3424 and 4424 yet. For the other relevant descriptions (including those about the insertion parts 244, 344 and 444 and the base portions 242, 342 and 442), please refer to the foregoing descriptions (including those about the base portions 242, 342 and 442 and the insertion parts 244, 344 and 444 in FIGS. 6-8), which will not be repeated in addition. In short, as shown by FIGS. 17-19, in the step S110, the joining portions 244*a*, 344*a* and 444*a* of the insertion parts 244, 344 and 444 individually has a non-circular sectional profile perpendicular to the extension direction D1. The portions of the plastic portions 2423, 3423 and 4423 corresponding to the joining portions 244*a*, 344*a* and 444*a* individually have a non-circular sectional profile perpendicular to the extension direction D1. The portions of the accommodating recesses 2422, 3422 and 4422 of the base portions 242, 342 and 442 corresponding to the joining portions 244*a*, 344*a* and 444*a* match with the joining portions 244*a*, 344*a* and 444*a* respectively. The positioning portions 244*b*, 344*b* and 444*b* of the insertion parts 244, 344 and 444 still are round columns and are assembled with the accommodating recesses 2422, 3422 and 4422 by slidably close-fitting, which also can perform a positioning effect. In the step S120, the portions of the accommodating recess 2422, 3422 and 4422 corresponding to the positioning portions 244*b*, 344*b* and 444*b* slidably close-fit with the positioning portions 244*b*, 344*b* and 444*b* respectively in the extension direction D1, so that the insertion parts 244, 344 and 444 are fixed in the accommodating recesses 2422, 3422 and 4422 in directions perpendicular to the extension direction D1. The portions of the accommodating recesses 2422, 3422 and 4422 corresponding to the joining portions 244*a*, 344*a* and 444*a* match with the joining portions 244*a*, 344*a* and 444*a* respectively for preventing the insertion parts 244, 344 and 444 from rotating.

Figure 20:
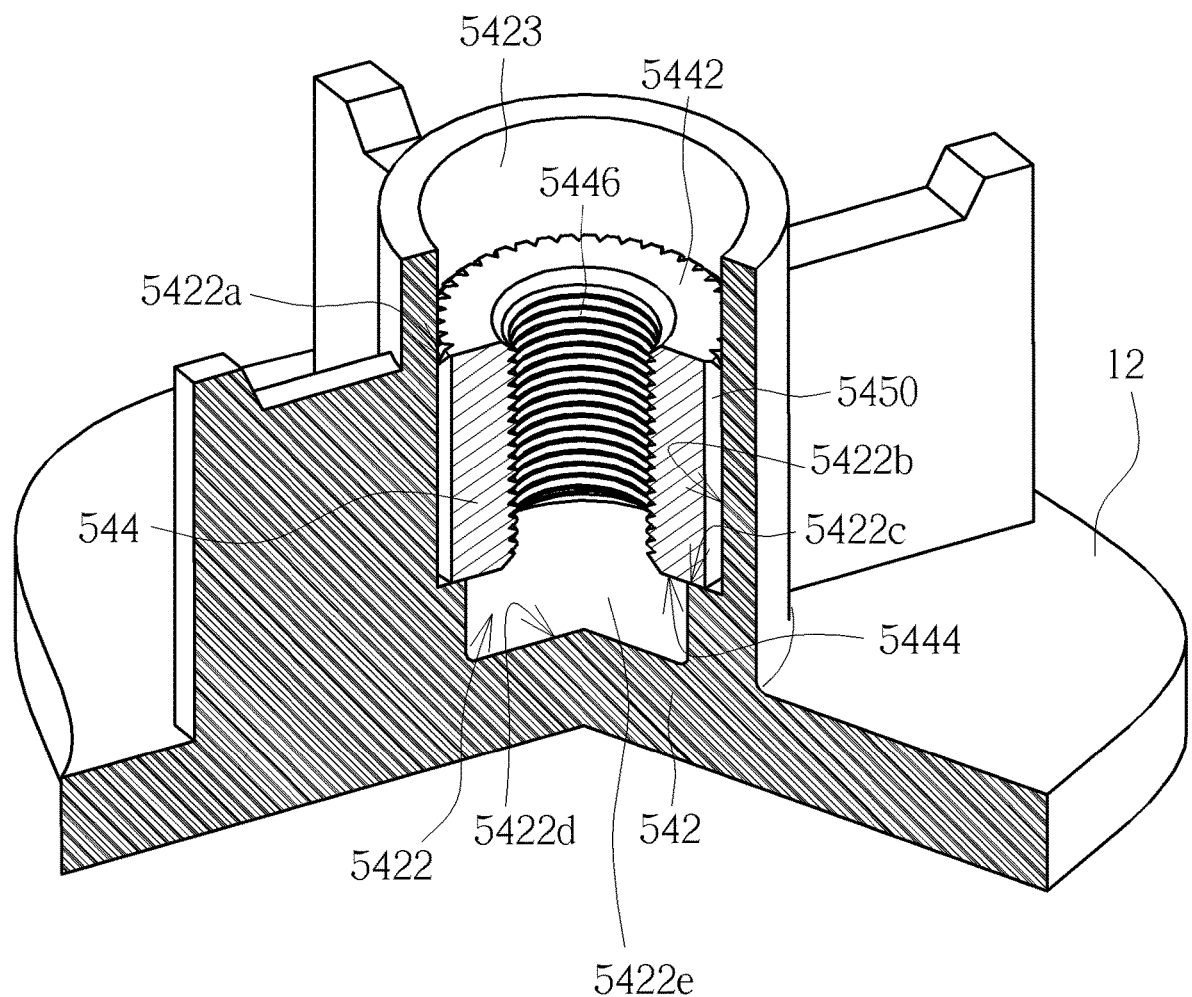
FIG. 20 is a schematic diagram illustrating a combination of an insertion part and a base portion with being partially cut according to another embodiment.

Furthermore, in the embodiment, the insertion part 144 is a column with a step structure. A protrusive radial plane formed by the step structure is taken as the positioning structure 1444 (or the positioned surface thereof); however, the disclosure is not limited thereto. Please refer to FIG. 20, which is a schematic diagram illustrating a combination of an insertion part 544 and a base portion 542 with being partially cut according to another embodiment. FIG. 20 is similar to FIG. 9. The difference is that a plastic portion 5423 of the base portion 542 in FIG. 20 has not shaped into the fixing portion 5424 yet. For the other relevant descriptions (including those about the insertion part 544 and the base portion 542), please refer to the foregoing descriptions (including those about the base portion 542 and the insertion part 544 in FIG. 9), which will not be repeated in addition. In short, as shown by FIG. 20, in the step S100, an accommodating recess 5422 of the base portion 542 has a sidewall surface 5422*b* and a supporting surface 5422*c* protruding out off the sidewall surface 5422*b*. In the step S110, the insertion part 544 is a column. A blocked surface 5442 and a positioning structure 5444 of the insertion part 544 are the two end surfaces of the column. In the step S120, the positioning structure 5444 abuts against the supporting surface 5422*c*, so that the accommodating recess 5422 supports the insertion part 544 for blocking the insertion part 544 from moving deeper in the accommodating recess 5422 (referring to FIG. 9).

Figure 21:
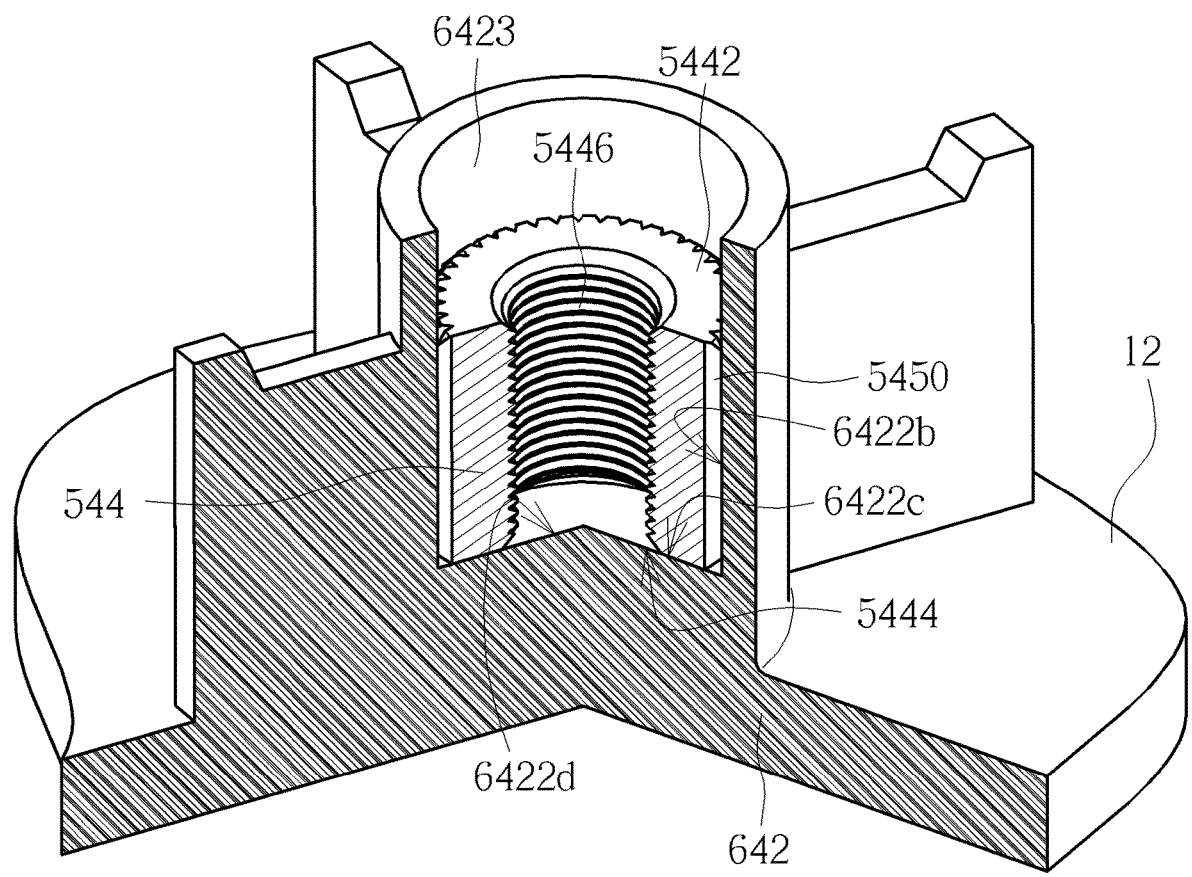
FIG. 21 is a schematic diagram illustrating a combination of an insertion part and a base portion with being partially cut according to another embodiment.

In addition, in the above embodiment, the insertion part 544 is supported in the accommodating recess 5422 by the supporting surface 5422*c* protruding out of the sidewall surface 5422*b*; however, the disclosure is not limited thereto. Please refer to FIG. 21, which is a schematic diagram illustrating a combination of the insertion part 544 and a base portion 642 with being partially cut according to another embodiment. FIG. 21 is similar to FIG. 10. The difference is that a plastic portion 6423 of the base portion 642 in FIG. 21 has not shaped into the fixing portion 6424 yet. For the other relevant descriptions (including those about the insertion part 544 and the base portion 542), please refer to the foregoing descriptions (including those about the base portion 542 and the insertion part 544 in FIG. 10), which will not be repeated in addition. In short, as shown by FIG. 21, in the step S100, an accommodating recess 6422 of the base portion 642 has a sidewall surface 6422*b* and a supporting surface 6422*c*. In the step S110, the method is to prepare the insertion part 544. In the step S120, the positioning structure 5444 (i.e. the lower end surface of the insertion part 544) abuts against the recess bottom surface 6422*d*, so that the accommodating recess 6422 supports the insertion part 544 (referring to FIG. 10).

As discussed above, in the process for producing the embedded connection socket 14, the method uses the plastic portion 1423, which is distinct from the accommodating recess 1422, to form the fixing portion 1424 which further can joins the joining portion 144*a* with the accommodating recess 1422. The structure of the accommodating recess 1422 is not damaged leading to structure deformation or even failure, so during the processes of inserting the insertion part 144 into the accommodating recess 1422 and shaping the plastic portion 1423, the structural strength of the accommodating recess 1422 can be maintained so that the insertion part 144 can be precisely and firmly disposed on the base portion 142. In other words, the embedded connection socket 14 produced by the method has the insertion part 144 which is precisely and firmly disposed therein. The above description also can applies to the joining of the insertion parts 244, 344, 444 and 544 with the accommodating recesses 2422, 3422, 4422, 5422 and 6422 respectively. Therefore, the embedded connection socket and the method for producing an embedded connection socket according to the disclosure can effectively solve the problems in the prior that the joining ways for joining the insertion part with the hole tend to damage or weaken the hole, and makes the position and angle of the insertion part relative to the hole difficult to control or deviated from a predetermined conditions.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An embedded connection socket, for joining a first object and a second object, the embedded connection socket being disposed on the first object and comprising:

a base portion comprising an accommodating recess and a fixing portion, the accommodating recess being a blind hole having an opening toward an opening direction, the fixing portion being made of thermoplastic material and protrusively extending in the opening direction from the opening; and an insertion part disposed in the accommodating recess, the insertion part comprising a blocked surface, a positioning structure, an engagement structure, a circumference surface, and a joining structure, the accommodating recess supporting the insertion part through the positioning structure, the blocked surface being located at the opening and being toward the opening direction, the positioning structure being located in the accommodating recess, the fixing portion covering and abutting against at least a portion of the blocked surface, the engagement structure being exposed through the opening, the joining structure being formed on the circumference surface and being adjacent to the blocked surface, the joining structure being located in the accommodating recess and joined to the accommodating recess, wherein the insertion part has an extension direction and comprises a positioning portion, and a portion of the accommodating recess corresponding to the positioning portion slidably fits with the positioning portion in the extension direction, so that the insertion part is fixed in the accommodating recess in a direction perpendicular to the extension direction.

2. The embedded connection socket of claim 1, wherein the joining structure comprises a plurality of grooves adjacent to the blocked surface.

3. The embedded connection socket of claim 1, wherein the insertion part comprises a joining portion, the joining portion and the positioning portion are arranged in the extension direction, the joining portion comprises the blocked surface and the circumference surface, an outer diameter of the circumference surface relative to the extension direction is larger than an outer diameter of the positioning portion relative to the extension direction, the positioning structure comprises a positioned surface between the joining portion and the positioning portion, the positioned surface and the extension direction are non-parallel, the accommodating recess has a sidewall surface and a supporting surface protruding out of the sidewall surface, and the accommodating recess supports the insertion part by the positioned surface abutting against the supporting surface.

4. The embedded connection socket of claim 3, wherein the insertion part is a column extending in the extension direction, and the blocked surface is located at an end surface of the column.

5. The embedded connection socket of claim 1, wherein the insertion part comprises a joining portion, the joining portion and the positioning portion are arranged in the extension direction, the joining portion comprises the blocked surface and has a non-circular sectional profile perpendicular to the extension direction, and a portion of the accommodating recess corresponding to the joining portion matches with the joining portion for preventing the insertion part from rotating.

6. The embedded connection socket of claim 1, wherein the insertion part is a column, the blocked surface and the positioning structure are two end surfaces of the column respectively, the accommodating recess has a sidewall surface and a supporting surface protruding out of the sidewall surface, and the accommodating recess supports the insertion part by the positioning structure abutting against the supporting surface.

7. The embedded connection socket of claim 1, wherein the insertion part is a column, the blocked surface and the positioning structure are two end surfaces of the column respectively, the accommodating recess has a recess bottom surface, and the accommodating recess supports the insertion part by the positioning structure abutting against the recess bottom surface.

8. The embedded connection socket of claim 1, wherein the fixing portion surrounds the opening.

9. The embedded connection socket of claim 1, wherein the engagement structure comprises a threaded hole or a threaded rod exposed through the opening, and the embedded connection socket is configured to be joined with the second object through the threaded hole or the threaded rod.

10. An assembly casing, comprising:
a first casing;
an embedded connection socket disposed on the first casing, the embedded connection socket comprising:
a base portion comprising an accommodating recess and a fixing portion, the accommodating recess being a blind hole having an opening toward an opening direction, the fixing portion being made of thermoplastic material and protrusively extending in the opening direction from the opening; and
an insertion part disposed in the accommodating recess, the insertion part comprising a blocked surface, a positioning structure, a first engagement structure, a circumference surface, and a joining structure, the accommodating recess supporting the insertion part through the positioning structure, the blocked surface being located at the opening and being toward the opening direction, the positioning structure being located in the accommodating recess, the fixing portion covering and abutting against at least a portion of the blocked surface, the first engagement structure being exposed through the opening, the joining structure being formed on the circumference surface and being adjacent to the blocked surface, the joining structure being located in the accommodating recess and joined to the accommodating recess;
a second casing; and
a second engagement structure disposed on the second casing, the second engagement structure and the first engagement structure being engaged so that the first casing and the second casing are joined, wherein the insertion part has an extension direction and rises a positioning portion, and a portion of the accommodating recess corresponding to the positioning portion slidably fits with the positioning portion in the extension direction, so that the insertion part is fixed in the accommodating recess in a direction perpendicular to the extension direction.

11. The assembly casing of claim 10, wherein the insertion part comprises a joining portion, the joining portion and the positioning portion are arranged in the extension direction, the joining portion comprises the blocked surface and the circumference surface, an outer diameter of the circumference surface relative to the extension direction is larger than an outer diameter of the positioning portion relative to the extension direction, the positioning structure comprises a positioned surface between the joining portion and the positioning portion, the positioned surface and the extension direction are non-parallel, the accommodating recess has a sidewall surface and a supporting surface protruding out of the sidewall surface, and the accommodating recess supports the insertion part by the positioned surface abutting against the supporting surface.

12. The assembly casing of claim 11, wherein the insertion part is a column extending in the extension direction, and the blocked surface is located at an end surface of the column.

13. The assembly casing of claim 10, wherein the insertion part comprises a joining portion, the joining portion and the positioning portion are arranged in the extension direction, the joining portion comprises the blocked surface and has a non-circular sectional profile perpendicular to the extension direction, and a portion of the accommodating recess corresponding to the joining portion matches with the joining portion for preventing the insertion part from rotating.

14. The assembly casing of claim 10, wherein the insertion part is a column, the blocked surface and the positioning structure are two end surfaces of the column respectively, the accommodating recess has a sidewall surface and a supporting surface protruding out of the sidewall surface, and the accommodating recess supports the insertion part by the positioning structure abutting against the supporting surface.

15. The assembly casing of claim 10, wherein the insertion part is a column, the blocked surface and the positioning structure are two end surfaces of the column respectively, the accommodating recess has a recess bottom surface, and the accommodating recess supports the insertion part by the positioning structure abutting against the recess bottom surface.

16. The assembly casing of claim 10, wherein the fixing portion surrounds the opening.

17. The assembly casing of claim 10, wherein the first engagement structure comprises a threaded hole or a threaded rod exposed through the opening, the second engagement structure comprises a screw or a nut rotatably disposed on the second case, the second engagement structure and the first engagement structure are engaged by the screw screwing in the threaded hole or the nut screwing on the threaded rod.

18. The assembly casing of claim 10, wherein the joining structure comprises a plurality of grooves adjacent to the blocked surface.

* * * * *